US012792644B2

(12) United States Patent
Sahadi et al.

(10) Patent No.: US 12,792,644 B2
(45) Date of Patent: Nov. 10, 2026

(54) CONVERSATIONALLY RESPONSIVE ANSWER INTERFACE SYSTEM

(71) Applicant: Ponchos & Huaraches, Inc., Bend, OR (US)

(72) Inventors: Scott Sebastian Sahadi, Solana Beach, CA (US); Wenzhong Zhao, San Diego, CA (US); Eric Scheie, La Mesa, CA (US); Maxwell De Jong, Worthington, OH (US); Steven Ratay, Lake Forest, IL (US); Thomas McLemore, Cedar Park, TX (US); Kelsey Hoff, San Diego, CA (US)

(73) Assignee: Ponchos & Huaraches, Inc., Bend, OR (US)

( * ) Notice: Subject to any disclaimer, the term of this patent is extended or adjusted under 35 U.S.C. 154(b) by 0 days.

(21) Appl. No.: 19/067,298

(22) Filed: Feb. 28, 2025

(65) Prior Publication Data

US 2026/0259899 A1 Sep. 3, 2026

(51) Int. Cl.

| | |
|---|---|
| ***G06F 16/3329*** | (2025.01) |
| ***G06F 16/3332*** | (2025.01) |
| ***G06F 16/334*** | (2025.01) |
| ***G06F 16/338*** | (2019.01) |

(52) U.S. Cl.
CPC .... *G06F 16/33295* (2025.01); *G06F 16/3332* (2019.01); *G06F 16/3344* (2019.01); *G06F 16/338* (2019.01)

(58) Field of Classification Search
CPC ........... G06F 16/33295; G06F 16/3332; G06F 16/3344; G06F 16/338
USPC .......................................................... 707/759
See application file for complete search history.

(56) References Cited

U.S. PATENT DOCUMENTS

| | | | | |
|---|---|---|---|---|
| 5,913,214 | A * | 6/1999 | Madnick | G06F 16/2452 |
| 9,390,131 | B1 * | 7/2016 | Fuller | G06F 16/2471 |
| 11,347,625 | B1 | 5/2022 | Agarwal et al. | |
| 2008/0127178 | A1 | 5/2008 | Smith et al. | |
| 2016/0140743 | A1 | 5/2016 | Neels et al. | |

(Continued)

OTHER PUBLICATIONS

U.S. Appl. No. 19/067,438, Non-Final Office Action dated Jan. 8, 2026.

(Continued)

*Primary Examiner* — Cam Y T Truong
(74) *Attorney, Agent, or Firm* — Polsinelli LLP

(57) ABSTRACT

Systems and methods are disclosed for responsive interfacing and/or metric tracking. A system receives a query through an interface. In some examples, the system modifies the query based on context data and a database schema to include some of the context data and to more closely align with the database schema. The system processes sub-queries associated with the modified query to generate respective responses to aspects of the query, which the system combines to synthesize an output response that answers the query. In some examples, the query identifies a metric to be tracked. The system analyzes datasets based on the metric and query context to identify data types accessible in the datasets and a calculation to calculate the metric using the data types. The system retrieves historical data from the datasets and generates a visualization that tracks the metric across a time period using the historical data and the calculation.

20 Claims, 13 Drawing Sheets

(56) References Cited

U.S. PATENT DOCUMENTS

| | | | | |
|---|---|---|---|---|
| 2019/0095508 | A1* | 3/2019 | Porath | G06F 16/34 |
| 2020/0104401 | A1* | 4/2020 | Burnett | G06F 16/287 |
| 2022/0019597 | A1* | 1/2022 | Takagi | G06F 16/25 |
| 2023/0015186 | A1* | 1/2023 | James | G06F 16/24542 |
| 2025/0278698 | A1 | 9/2025 | Fahim et al. | |
| 2026/0259900 | A1 | 9/2026 | Sahadi et al. | |

OTHER PUBLICATIONS

U.S. Appl. No. 19/067,438, Scott Sebastian Sahadi, Responsive Query-Based Metric Tracking and Visualization, filed Feb. 28, 2025.
U.S. Appl. No. 19/338,498, Oded Noy, Schema-Aware Semantic Translation and Query Generation, filed Sep. 24, 2025.
U.S. Appl. No. 19/067,438, Final Office Action dated Aug. 21, 2026.

* cited by examiner

200

500

CONVERSATIONALLY RESPONSIVE ANSWER INTERFACE SYSTEM

TECHNICAL FIELD

This disclosure is relates an artificial intelligence agentic conversational interface that assists with interpreting datasets, and, in particular, relates to interpretation of a natural language query through retrieval of contextual information relevant to the query, query modification based on contextual information and database schemas, division of the query into sub-queries, calculation of metrics based on retrieved data, synthesis of responses to sub-queries into an output response, generation of visualizations, and/or triggering of alerts based on data monitoring.

BACKGROUND

Data platforms can include enormous volumes of data that can be difficult to parse through. Data platforms can be used to store sales data, health data, transaction data, location data, vehicle data, and/or other types of data. In some cases, data platforms can receive and/or generate data at a faster rate than any human being could read or understand the data.

SUMMARY

Systems and methods are described for responsive interfacing and/or metric tracking. A system receives a query through an interface. In some examples, the system modifies the query based on context data and a database schema to include some of the context data and to more closely align with the database schema. The system processes sub-queries associated with the modified query to generate respective responses to aspects of the query, which the system combines to synthesize an output response that answers the query. In some examples, the query identifies a metric to be tracked. The system analyzes datasets based on the metric and query context to identify data types accessible in the datasets and a calculation to calculate the metric using the data types. The system retrieves historical data from the datasets and generates a visualization that tracks the metric across a time period using the historical data and the calculation.

In an example, a method is provided for responsive interfacing. The method includes receiving a query through a user interface. The query includes a term. The method includes retrieving context data associated with the term. The method includes modifying the query according to the context data and a database schema to generate a modified query. The modified query includes at least a subset of the context data. The modified query includes at least one modified term that aligns with the database schema. The method includes processing a plurality of sub-queries associated with the modified query to generate respective responses to a plurality of aspects of the query. The method includes combining the respective responses to the plurality of aspects of the query to synthesize an output response that answers the query. The method includes outputting the output response through the user interface.

In another example, a system is provided for responsive interfacing. The system includes a memory storing instructions and a processor that executes the instructions. Execution of the instructions by the processor causes the processor to perform operations. The operations include receiving a query through a user interface. The query includes a term. The operations include retrieving context data associated with the term. The operations include modifying the query according to the context data and a database schema to generate a modified query. The modified query includes at least a subset of the context data. The modified query includes at least one modified term that aligns with the database schema. The operations include processing a plurality of sub-queries associated with the modified query to generate respective responses to a plurality of aspects of the query. The operations include combining the respective responses to the plurality of aspects of the query to synthesize an output response that answers the query. The operations include outputting the output response through the user interface.

In another example, a non-transitory computer readable storage medium is provided, having embodied thereon a program. The program is executable by a processor to perform a method of responsive interfacing. The method includes receiving a query through a user interface. The query includes a term. The method includes retrieving context data associated with the term. The method includes modifying the query according to the context data and a database schema to generate a modified query. The modified query includes at least a subset of the context data. The modified query includes at least one modified term that aligns with the database schema. The method includes processing a plurality of sub-queries associated with the modified query to generate respective responses to a plurality of aspects of the query. The method includes combining the respective responses to the plurality of aspects of the query to synthesize an output response that answers the query. The method includes outputting the output response through the user interface.

In another example, a system is provided for responsive interfacing. The system includes means for receiving a query through a user interface. The query includes a term. The system includes means for retrieving context data associated with the term. The system includes means for modifying the query according to the context data and a database schema to generate a modified query. The modified query includes at least a subset of the context data. The modified query includes at least one modified term that aligns with the database schema. The system includes means for processing a plurality of sub-queries associated with the modified query to generate respective responses to a plurality of aspects of the query. The system includes means for combining the respective responses to the plurality of aspects of the query to synthesize an output response that answers the query. The system includes means for outputting the output response through the user interface.

In an example, a method is provided for metric tracking. The method includes receiving a query through a user interface. The query identifies a metric to be tracked. The method includes interpreting the query to identify context associated with the metric. The method includes analyzing a plurality of datasets based on the metric and the context to identify a plurality of types of data accessible in the plurality of datasets. The method includes identifying a calculation to calculate the metric using the plurality of types of data. The method includes retrieving historical data of the plurality of types of data from the plurality of datasets. The historical data is associated with a time period. Different subsets of the historical data are associated with different points in time within the time period. The method includes generating a visualization that tracks the metric across the time period based on the historical data and the calculation. The method includes outputting the visualization through the user interface.

In another example, a system is provided for metric tracking. The system includes a memory storing instructions and a processor that executes the instructions. Execution of the instructions by the processor causes the processor to perform operations. The operations include receiving a query through a user interface. The query identifies a metric to be tracked. The operations include interpreting the query to identify context associated with the metric. The operations include analyzing a plurality of datasets based on the metric and the context to identify a plurality of types of data accessible in the plurality of datasets. The operations include identifying a calculation to calculate the metric using the plurality of types of data. The operations include retrieving historical data of the plurality of types of data from the plurality of datasets. The historical data is associated with a time period. Different subsets of the historical data are associated with different points in time within the time period. The operations include generating a visualization that tracks the metric across the time period based on the historical data and the calculation. The operations include outputting the visualization through the user interface.

In another example, a non-transitory computer readable storage medium is provided, having embodied thereon a program. The program is executable by a processor to perform a method of metric tracking. The method includes receiving a query through a user interface. The query identifies a metric to be tracked. The method includes interpreting the query to identify context associated with the metric. The method includes analyzing a plurality of datasets based on the metric and the context to identify a plurality of types of data accessible in the plurality of datasets. The method includes identifying a calculation to calculate the metric using the plurality of types of data. The method includes retrieving historical data of the plurality of types of data from the plurality of datasets. The historical data is associated with a time period. Different subsets of the historical data are associated with different points in time within the time period. The method includes generating a visualization that tracks the metric across the time period based on the historical data and the calculation. The method includes outputting the visualization through the user interface.

In another example, a system is provided for metric tracking. The system includes means for receiving a query through a user interface. The query identifies a metric to be tracked. The system includes means for interpreting the query to identify context associated with the metric. The system includes means for analyzing a plurality of datasets based on the metric and the context to identify a plurality of types of data accessible in the plurality of datasets. The system includes means for identifying a calculation to calculate the metric using the plurality of types of data. The system includes means for retrieving historical data of the plurality of types of data from the plurality of datasets. The historical data is associated with a time period. Different subsets of the historical data are associated with different points in time within the time period. The system includes means for generating a visualization that tracks the metric across the time period based on the historical data and the calculation. The system includes means for outputting the visualization through the user interface.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Systems and methods are disclosed for responsive interfacing and/or metric tracking. In some examples, a system for responsive interfacing receives a query through a user interface. The query includes a term. The system retrieves context data associated with the term, for instance through a retrieval augmented generation (RAG) query to a data structure. The system modifies the query according to the context data and/or a database schema to generate a modified query. The modified query can include at least a subset of the context data, and can include at least one modified term that aligns with the database schema (e.g., that matches a column in a database). The system processes a plurality of sub-queries (e.g., database queries) associated with the modified query to generate respective responses to a plurality of aspects of the query. The system combines the respective responses to the plurality of aspects of the query to synthesize an output response that answers the query, and, in some examples, is conversationally responsive to the query. The system outputs the output response through the user interface.

In some examples, a system for metric tracking receives a query through a user interface. The query identifies a metric, such as a key performance indicator (KPI), to be tracked. The system interprets the query to identify context associated with the metric. The system analyzes a plurality of datasets based on the metric and the context to identify a plurality of types of data accessible in the plurality of datasets. The system identifies a calculation to calculate the metric using the plurality of types of data (e.g., a sum of data from two or more of the types of data, a difference of data from two or more of the types of data, a product of data from two or more of the types of data, a ratio of data from two or more of the types of data, or a combination thereof). The system retrieves historical data of the plurality of types of data from the plurality of datasets. The historical data is associated with a time period. Different subsets of the historical data are associated with different points in time within the time period (e.g., different seconds, minutes, hours, days, weeks, months, and/or years within the time period). The system generates a visualization (e.g., a graph, a chart, and/or a table) that tracks the metric across the time period based on the historical data and the calculation. The system outputs the visualization through the user interface, for instance along with a response that is conversationally responsive to the query.

Figure 1:
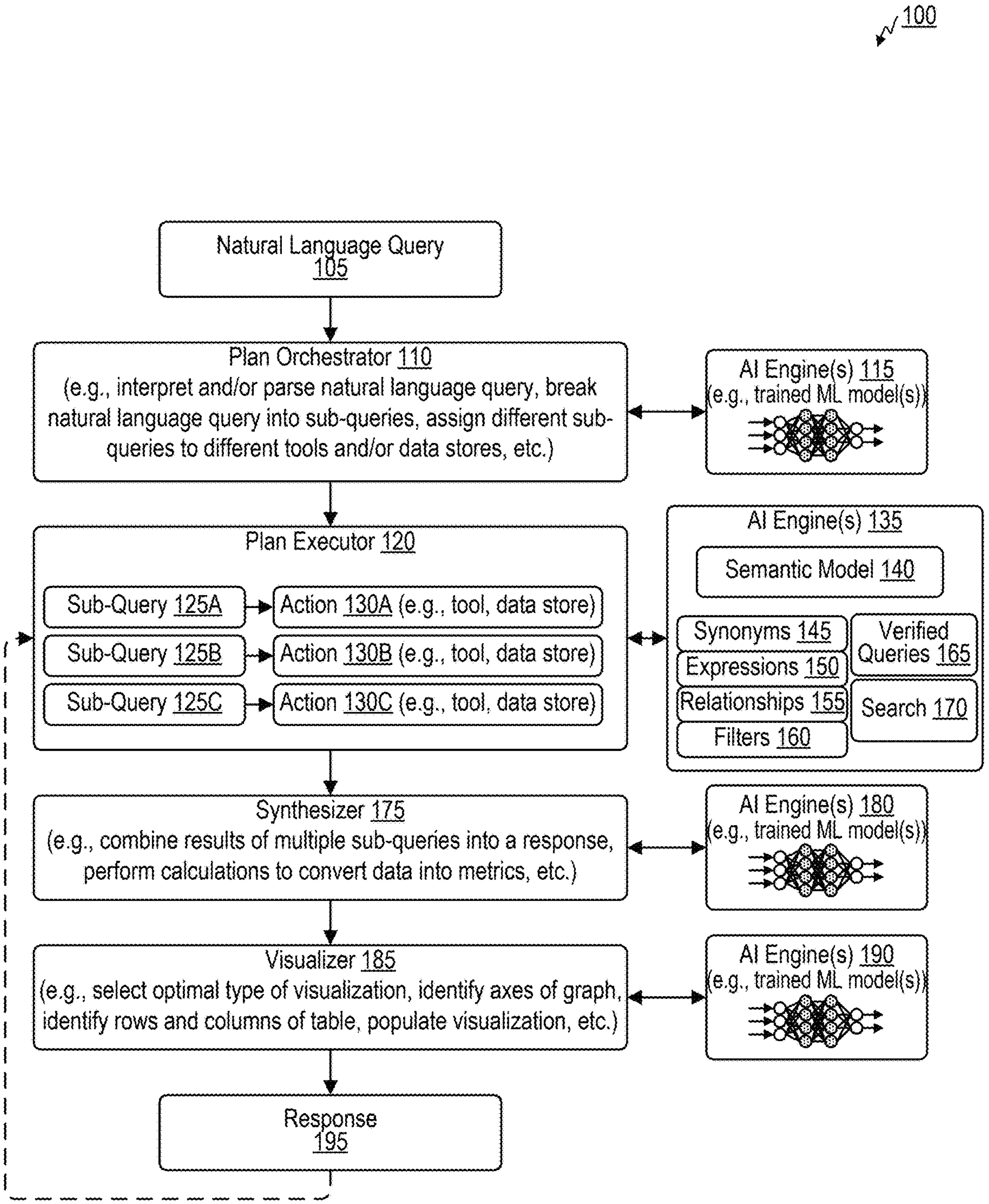
FIG. 1 is a block diagram illustrating a system architecture of a responsive interfacing system, in accordance with some examples.

FIG. 1 is a block diagram illustrating a system architecture of a responsive interfacing system 100. The responsive interfacing system 100 receives a natural language query 105 through a user interface (UI), for instance a UI associated with an application and/or a website. The UI can receive the query in response to receipt of inputs in a hardware interface of a user device used by a user. The user device may be an example of a computer system 1300.

The responsive interfacing system 100 includes a plan orchestrator 110. The plan orchestrator 110 performs an initial parsing and/or interpretation of the natural language query 105 to plan how to most effectively and/or efficiently answer the query, and/or to orchestrate which of a set of different tools and/or datasets is to be used by a plan executor 120 of the responsive interfacing system 100 to retrieve data to be used to answer different aspects of the query.

In some examples, the plan orchestrator 110 can parse, interpret, and/or analyze the natural language query 105 to break the natural language query 105 into multiple sub-queries, such as the sub-queries 125A-125C. The plan orchestrator 110 can identify actions, such as the actions 130A-130C, to be performed by the plan executor 120 to answer each of the sub-queries 125A-125C. For instance, the plan orchestrator 110 can identify an action 130A to perform to answer the sub-query 125A, an action 130B to perform to answer the sub-query 125B, and an action 130C to perform to answer the sub-query 125C. Each action can refer to a specific tool or set of tools to use to process the sub-query, a specific data store (e.g., data structure) or set of data stores to retrieve data from to answer the sub-query, or a combination thereof. In some examples, at least some of the sub-queries 125A-125C can be (or can include) database queries, and the corresponding actions (of the actions 130A-130C) can include retrieval of database data by querying one or more databases using the database queries. In some examples, the plan orchestrator 110 can identify at least a subset of the sub-queries 125A-125C to be processed in parallel, in series, or a combination thereof. In some examples, the plan orchestrator 110 can identify (e.g., extract, split, divide, break down) the sub-queries 125A-125C from the natural language query 105 by applying a chain of thought (CoT) approach to delineating complex tasks into a sequence of logical steps towards a final resolution.

In some examples, the plan orchestrator 110 includes, and/or has access to, artificial intelligence (AI) tool(s) in the form of an AI engine 115. In some examples, the AI engine 115 includes one or more machine learning (ML) models, such as one or more neural networks (NNs), one or more transformers, one or more large language models (LLMs), one or more support vector machines (SVMs), one or more rules-based artificial intelligence algorithms, one or more heuristic-based artificial intelligence algorithms, or a combination thereof. The plan orchestrator 110 can use the AI engine 115 to interpret and/or parse the natural language query 105. For instance the plan orchestrator 110 can use a natural language processing (NLP) algorithm and/or LLM of the AI engine 115 to interpret and/or parse the natural language query 105, modify the natural language query 105, determine a level of complexity of the natural language query 105, extract sub-queries (e.g., sub-queries 125A-125C) from the natural language query 105 if the natural language query 105 is above a threshold level of complexity, or a combination thereof.

In an illustrative example, if the natural language query 105 requests data regarding acceleration of a vehicle, and the database(s) that the plan orchestrator 110 has access to databases that only have location data for the vehicle and timestamps for the location data, the sub-queries 125A-125C can include queries for the location data and the timestamps. The corresponding actions 130A-130C can identify which data structures the plan executor 120 is to retrieve the location data and the timestamps from, any filters or database query attributes to be used by the plan executor 120 to ensure that the retrieved location data and the timestamps relate to the vehicle of interest (e.g., and not other vehicles), calculations to be performed by the plan executor 120 (and/or synthesizer 175) to calculate acceleration from the location data and the timestamps (e.g., first calculating two velocities from the location data and timestamps, then calculating acceleration based on a velocity change between the two velocities), and/or other actions to be taken to track acceleration of the vehicle.

The plan executor 120 executes the plan orchestrated by the plan orchestrator 110, for instance performing the actions 130A-130C to resolve the sub-queries 125A-125C. For instance, if the actions 130A-130C involve retrieval of data from specific data stores, the plan executor 120 can access those data stores and retrieve the indicated data. If the actions 130A-130C involve processing data (e.g., the sub-queries 125A-125C) using specific tools (e.g., specific LLMs, ML models, and/or other algorithms), the plan executor 120 can input that data into those tools, and initiate and/or run those tools, to process that data using those tools. In some examples, the plan executor 120 includes an AI engine 135. The AI engine 135 can include any of the types of models and/or algorithms discussed with respect to the AI engine 115. In some examples, the actions 130A-130C involve processing queries (e.g., the natural language query 105, the sub-queries 125A-125C) using specific tools (e.g., specific LLMs, ML models, and/or other algorithms) to generate responses to the queries. The responses can be conversationally responsive to the queries, for instance generated using LLMs of the AI engine 135. In some examples, the plan executor 120 can process at least a subset of the sub-queries 125A-125C (e.g., by performing at least a subset of the actions 130A-140C) in parallel, in series, or a combination thereof.

In some examples, the plan orchestrator 110 and/or plan executor 120 can modify the natural language query 105 by adding context data to the natural language query 105. For instance, in some examples, the plan orchestrator 110 and/or the plan executor 120 can perform retrieval augmented generation (RAG) by identifying a term in the natural language query 105, generating a RAG query associated with the term, retrieving context data corresponding to the term, and adding at least a subset of the context data the natural language query 105 to generate a modified or enhanced variant of the natural language query 105. For instance, if the natural language query 105 includes a question involving a specific rule (e.g., law, regulation, or technical standard), the RAG query can be used to retrieve the text of the rule from a data store, and import at least a subset of the text of the rule into the natural language query 105 for analysis along with the rest of the natural language query 105. In another example, if the natural language query 105 includes a question involving a specific device, the RAG query can be used to retrieve text associated with a user manual, a technical specification, a component list, and/or troubleshooting tips guide associated with the device from a data store, and import at least a subset of the text into the natural language query 105 for analysis along with the rest of the natural language query 105.

In some examples, the plan orchestrator 110 and/or plan executor 120 can modify the natural language query 105 by translating and/or converting certain terminology in the natural language query 105. This can be referred to as a translation layer, a translation process, a modification layer, or a modification process. In some examples, the plan orchestrator 110 and/or plan executor 120 can modify term(s) in the natural language query 105 to match schema and/or metadata of the database(s) (and/or other types of data stores) that the responsive interfacing system 100 has access to. For instance, the schema can identify columns in a database, axes in a graph, rows and columns in a table or spreadsheet, and the like. In an illustrative example, if the natural language query 105 includes a question about "speed," but the various databases use the term "velocity" in their columns instead, the plan orchestrator 110 and/or plan executor 120 can modify the natural language query 105 to use the term "velocity" in place of the term "speed."

In some examples, the responsive interfacing system 100 (e.g., the plan orchestrator 110, the AI engine 115, the plan executor 120, and/or the AI engine 135) can generate and/or use a semantic model 140 to translate and/or convert the terminology in the natural language query 105 to align with data store schema and/or metadata. The semantic model 140 can represent various data store schema and/or metadata. For instance, the responsive interfacing system 100 can add various dimensions, time-dimensions, measures, synonyms, filters, and/or custom instructions associated with the data stores to the semantic model 140. In some examples, the semantic model 140 maps certain terminology to database schemas and adds contextual meaning. For example, when a user asks about "total revenue last year", the semantic model 140 can interpret "revenue" as net revenue, and "last year" as the previous calendar year. This mapping helps the responsive interfacing system 100 understand the intent behind the natural language query 105, and to provide accurate answers (e.g., to the natural language query 105 and/or the sub-queries 125A-125C).

In some examples, the responsive interfacing system 100 (e.g., the plan orchestrator 110, the AI engine 115, the plan executor 120, the AI engine 135, and/or the semantic model 140) can leverage synonyms 145, expressions 150, relationships 155, filters 160, verified queries 165, and/or search 170 to modify the natural language query 105, answer the natural language query 105 and/or its sub-queries 125A-125C, perform the actions 130A-130C, or a combination thereof. Synonyms 145 can identify terms that can be used synonymously, such as "North America," "North American Region," "N. Amer.," "NA," and the like. In another example, "profit," "earnings," and "net income" could be considered synonyms 145. In some examples, the expressions 150 can include database columns, physical columns in a base table, logical columns in a logical table, dimensions, filters, facts, and/or metrics. For instance, in some examples, expressions 150 related to North America can identify that North America includes the United States, Canada, and Mexico. The relationships 155 can identify relationships between data structures and/or records within the data structures. For instance, the relationships 155 can identify a relationship between a data structure that identifies customers and a data structure that identifies purchases (e.g., by the customers). The filters 160 can refer to conditions that limit query results to specific data subsets based on criteria such as time period, location, or category. In an illustrative example, "North America" can be used as one of the filters 160, for instance to limit query results to data from North American customers, purchases, devices, vehicles, and the like.

The verified queries 165 refer to a collection of questions and corresponding SQL queries that are verified to be accurate and/or correct. For instance, the verified queries 165 can identify that requests for information (e.g., in the natural language query 105 or sub-queries 125A-125C) about profit can be calculated as a difference between income (retrieved via one database query) and cost (retrieved via another database query). The verified queries 165 can similarly identify that requests for information (e.g., in the natural language query 105 or sub-queries 125A-125C) about profit in California in the last month can be calculated as a difference between income (retrieved via one database query) and cost (retrieved via another database query), filtered to be limited to the region of California, and filtered to be limited in a time dimension to the previous calendar month. In some examples, popular questions can be added to the verified queries 165 such as questions used in an onboarding process. In some examples, successfully answered queries can be added to the verified queries 165, for instance where feedback (e.g., feedback 855) has been received indicating that a response to a query is accurate.

The search 170 can use the AI engine 135, the semantic model 140, the synonyms 145, the expressions 150, the relationships 155, the filters 160 and/or the verified queries 165 to perform a "fuzzy" search over data across multiple data stores. The "fuzzy" search improves over a strict "find" operation by searching for synonyms (through the semantic model 140 and/or synonyms 145) and/or related terms (e.g., through expressions 150 and/or relationships 155), by searching in related data stores (e.g., through relationships 155), or a combination thereof. The search 170 is kept efficient through the use of filters 160, limiting the amount of data to be searched intelligently. The search 170 is kept accurate through the use of verified queries 165 where possible, ensuring that verified translations from natural language queries (e.g., natural language query 105 and/or some of the sub-queries 125A-125C) to database queries (e.g., some of the sub-queries 125A-125C) are used where possible, and/or that verified translations are used as a guide for new translations where no verified translation is available (in the verified queries 165).

In some examples, the responsive interfacing system 100 (e.g., the plan orchestrator 110, the AI engine 115, the plan executor 120, the AI engine 135) can add organization-specific logics to verified queries 165 and/or sub-queries (e.g., query to database pairs) to provide hints to the LLMs (e.g., in the AI engine 115 and/or the AI engine 135), for instance as few-shot examples for the AI engine 115 and/or the AI engine 135. In some examples, the responsive interfacing system 100 (e.g., the plan orchestrator 110, the AI engine 115, the plan executor 120, the AI engine 135) can use few-shot prompting, a technique where a language model is given a small number of example inputs and outputs to guide its response to a specific task, essentially allowing it to learn a new task with very little training data, sitting between zero-shot learning (no examples) and fully supervised fine-tuning (large amounts of labeled data). In some examples, the responsive interfacing system 100 (e.g., the plan orchestrator 110, the AI engine 115, the plan executor 120, the AI engine 135) can construct logical schema (e.g., relationships 155) based on underlying physical schema to avoid using joins by the LLMs.

In some examples, the responsive interfacing system 100 (e.g., the plan orchestrator 110, the AI engine 115, the plan executor 120, the AI engine 135) can collect feedback on queries and responses, including successful queries (e.g., whose translations from natural language query to database query can be stored in the verified queries 165) and/or unsuccessful queries (failed queries) over time (e.g., queries that resulted in errors or inaccurate results). The unsuccessful queries can also be stored, with instructions to the AI engine 115 and/or the AI engine 135 to avoid similar responses given similar queries, thereby reducing reoccurrence of the same errors and inaccuracies (e.g., preventing errors, false positives, and/or false negatives).

In some examples, the plan executor 120 and/or the AI engine 135 can add additional context (e.g., through additional RAG queries) and/or translation layers to the natural language query 105 and/or the sub-queries 125A-125C to enhance accuracy and/or efficiency of the responses to the language query 105 and/or the sub-queries 125A-125C. In some examples, the responsive interfacing system 100 (e.g., the plan orchestrator 110, the AI engine 115, the plan executor 120, and/or the AI engine 135) can perform pre-processing to translate business queries with domain-specific terms and/or industry-specific terms into more schema-aligned queries with schema-aligned terms that are aligned with the underlying database schema.

The synthesizer 175 combines results of multiple sub-queries (e.g., sub-queries 125A-125C) into a response 195 (e.g., a single response). In some examples, the synthesizer 175 performs calculations to convert data of different categories into metrics requested in the natural language query 105, for instance converting location data and corresponding timestamps into velocity data and/or acceleration data according to one or more calculations (e.g., equations), or converting income data and cost data into profit data according to one or more calculations (e.g., equations). In some examples, the synthesizer 175 includes an AI engine 180. The AI engine 180 can include any of the types of models, algorithms, and/or other elements discussed with respect to the AI engine 115, the AI engine 135, or a combination thereof.

In some examples, the responsive interfacing system 100 (e.g., the plan executor 120, the AI engine 135, the synthesizer 175, and/or the AI engine 180) can perform post-processing, for instance adding additional context (e.g., through additional RAG queries) and/or translation layers to the data retrieved by the plan executor 120 and/or the AI engine 135, and/or to the responses to the sub-queries 125A-125C generated by the plan executor 120 and/or the AI engine 135. In some examples, the translation layer, at this stage, can translate terms back from the schema-aligned terminology (e.g., that the initial translation layers translated terms from the natural language query 105 to) back to terms used in the natural language query 105, so that the terms used in the synthesized response 195 align with the terms used in the natural language query 105.

The visualizer 185 can generate a visualization, and add a visualization to the synthesized response 195, so that the synthesized response 195 includes the visualization. The visualization can include, for instance, a graph, a chart, a table, a spreadsheet, or a combination thereof. For instance, the visualization can include a bar graph or bar chart, a line graph or line chart, a pie chart, a scatter plot, a histogram, an area chart, a heatmap, a bubble chart, a box plot, a waterfall chart, a funnel chart, a Gantt chart, a radar chart, a treemap, a donut chart, a choropleth map, a dendrogram, a network graph, a word cloud, a bullet chart, a sparkline, a waterfall chart, a streamgraph, a sunburst chart, a parallel coordinates, a glyph chart, a cartogram, a pictogram, a map animation, a table, another type of visualization, or a combination thereof. In some examples, the visualizer 185 selects the optimal type of visualization (e.g., of the various types of visualizations listed above) for the data in the synthesized response 195, identifies the dimensions of the visualization (e.g., the axes of a graph or charts, the rows and/or the columns of a table), and populates the visualization with data, in some cases performing calculations as needed to obtain data needed to populate the visualization with data. The visualizer 185 can select the type of visualization, and/or identify the dimensions of the visualization, based on the type of data in the response 195, based on the natural language query 105, based on context from a RAG query, based on types of data in the data sources that the plan executor 120 pulled data from to generate the synthesized response 195, or a combination thereof. In some examples, the visualizer 185 includes an AI engine 190. The AI engine 190 can include any of the types of models, algorithms, and/or other elements discussed with respect to the AI engine 115, the AI engine 135, the AI engine 180, or a combination thereof.

In some examples, the responsive interfacing system 100 continues retrieving and processing data even after the synthesized response 195 and/or visualization are generated, as indicated by the dashed arrow from the synthesized response 195 back to the plan executor 120. For instance, in some examples, the data source(s) that the plan orchestrator 110, the plan executor 120, and/or the synthesizer 175 draw from to answer the natural language query 105 (and/or the sub-queries 125A-125C) continue to receive and/or generate additional data over time. In some examples, the responsive interfacing system 100 (e.g., the plan orchestrator 110, AI engine 115, the plan executor 120, the AI engine 135, the synthesizer 175, the AI engine 180, the visualizer 185, and/or the AI engine 190) can continue to update the synthesized response 195 and/or visualizations dynamically in real-time (or near real-time) as additional data is retrieved and/or generated at the data sources. For instance, the plan executor 120 can continue to perform the actions 130A-130C periodically over time, and can continue to generate responses to the sub-queries 125A-125C over time, even after the synthesized response 195 is generated. The synthesizer 175 can continue to combine these updated responses to the sub-queries 125A-125C to synthesize updated versions of the synthesized response 195. The visualizer 185 can continue to use the updated responses (to the natural language query 105 and/or the sub-queries 125A-125C) and/or other updated data to update the visualization in the synthesized response 195 over time. In this way, the synthesized response 195 (and/or the visualization therein) remains up-to-date whenever the user checks the response 195 (and/or the visualization). In some examples, the response 195 (and/or the visualization) can be moved to a dashboard (e.g., as in the dashboard with the user interface 610).

This continuous updating functionality can also be used by the responsive interfacing system 100 to continue monitoring a specific metric over time, for instance to track the metric over time and alert a user (e.g., send a message to a user device) if the metric reaches or crosses a specified threshold. In some examples, the threshold can be a lower threshold or limit (e.g., a minimum threshold), and crossing the threshold can refer to dropping below the threshold. In some examples, the threshold can be an upper threshold or limit (e.g., a maximum threshold), and crossing the threshold can refer to exceeding the threshold.

In some examples, the threshold can be specified by the user, for instance as part of the natural language query 105 or as part of a follow-up message. In some examples, the threshold can be automatically selected by the responsive interfacing system 100, for instance based on a maximum value for the metric (e.g., based on historical data), a minimum value for the metric (e.g., based on historical data), an average value (e.g., mean, median, and/or mode) for the metric (e.g., based on historical data), a standard deviation associated with the metric (e.g., based on historical data), or a combination thereof. For instance, in some examples, the responsive interfacing system 100 can automatically select the threshold to mark the boundary of an upper or lower quartile, or a specific percentile, based on an average with an offset (e.g., of a standard deviation multiplied by a multiplier and/or with an additional offset).

Figure 2:
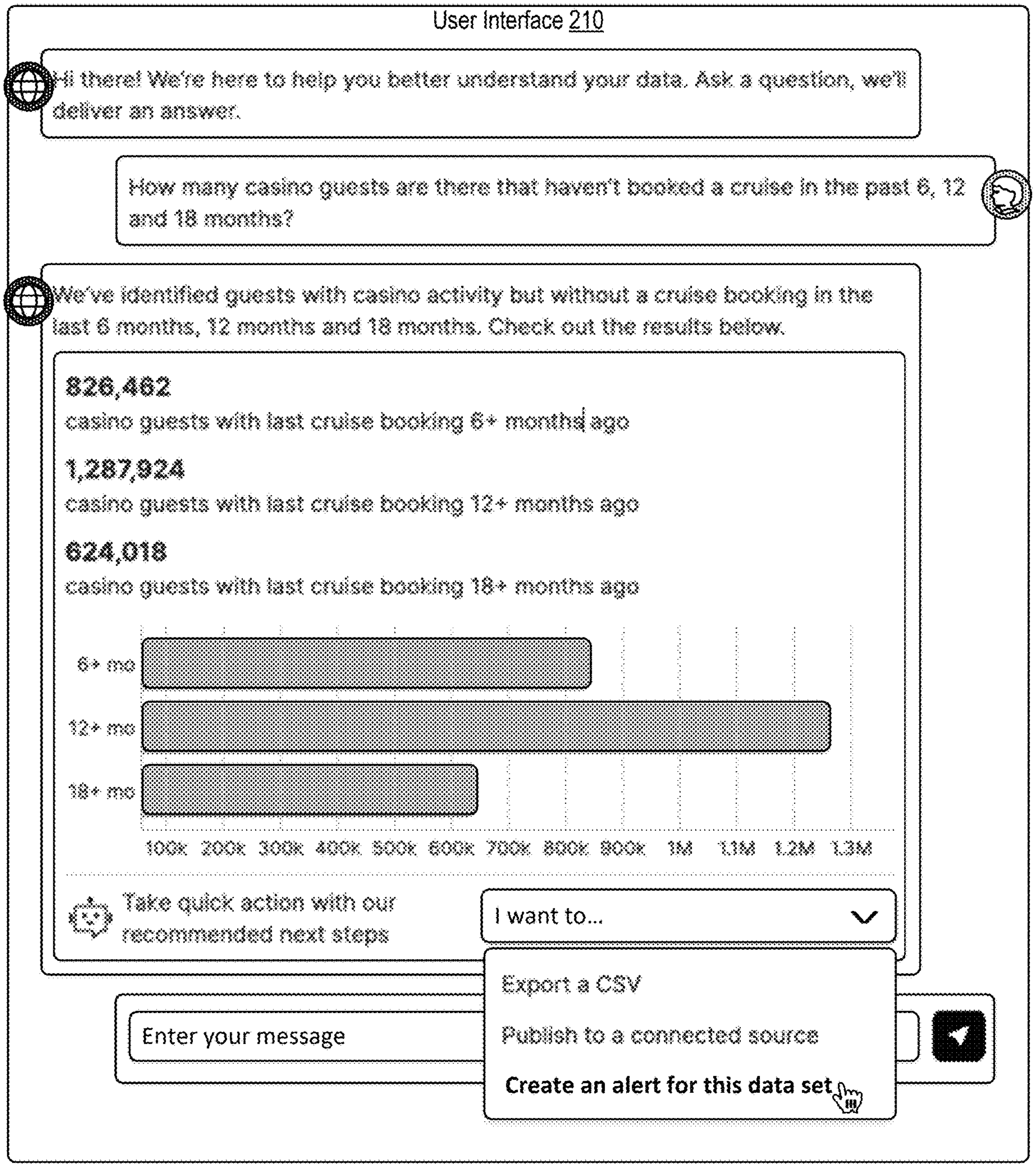
FIG. 2 is a conceptual diagram illustrating an example of a user interface in which a user requests an artificial intelligence (AI) agent to track a customer type metric with respect to data from a data set, in accordance with some examples.

FIG. 2 is a conceptual diagram 200 illustrating an example of a user interface 210 in which a user requests an artificial intelligence (AI) agent to track a customer type metric with respect to data from a data set. The user interface 210 is a conversational interface, such as a chat interface. After an introductory statement from the AI agent, a query from the user (e.g., which is an example of the natural language query 105) states "How many casino guests are there that haven't booked a cruise in the past 6, 12 and 18 months?" The AI agent responds with a response stating "We've identified guests with casino activity but without a cruise booking in the last 6 months, 12 months and 18 months" and provides a visualization of the results. This response, with the visualization or without, is an example of the synthesized response 195. The visualization indicates that 826,462 casino guests had their last cruise booking 6+ months ago, that 1,287,924 casino guests had their last cruise booking 12+ months ago, and that 624,018 casino guests had their last cruise booking 18+ months ago. The visualization visualizes this metric in a bar chart, with a vertical axis representing the different time periods since the last cruise booking, and with the horizontal axis representing the number of guests.

The user interface 210 includes an "I want to" dropdown menu providing options for the user of recommended next steps of what to do with the data in the response and/or in the visualization. The next steps in the dropdown menu include "export to CSV" to export to a comma separated values (CSV) spreadsheet file, "publish to a connected source" to publish the visualization and/or the full response to a website or cloud service or other network-connected portal, and "create an alert for this data source" to request that the AI agent continue to monitor this metric from the same data source(s) and to send an alert (to the user's device) if a specified threshold is reached and/or crossed. A cursor is illustrated hovering over the "create an alert for this data source" option, indicating an input through the user interface 310 selecting the "create an alert for this data source" option. The user interface 310 also includes an "enter your message" interface, allowing the user to write in another message.

Figure 3:
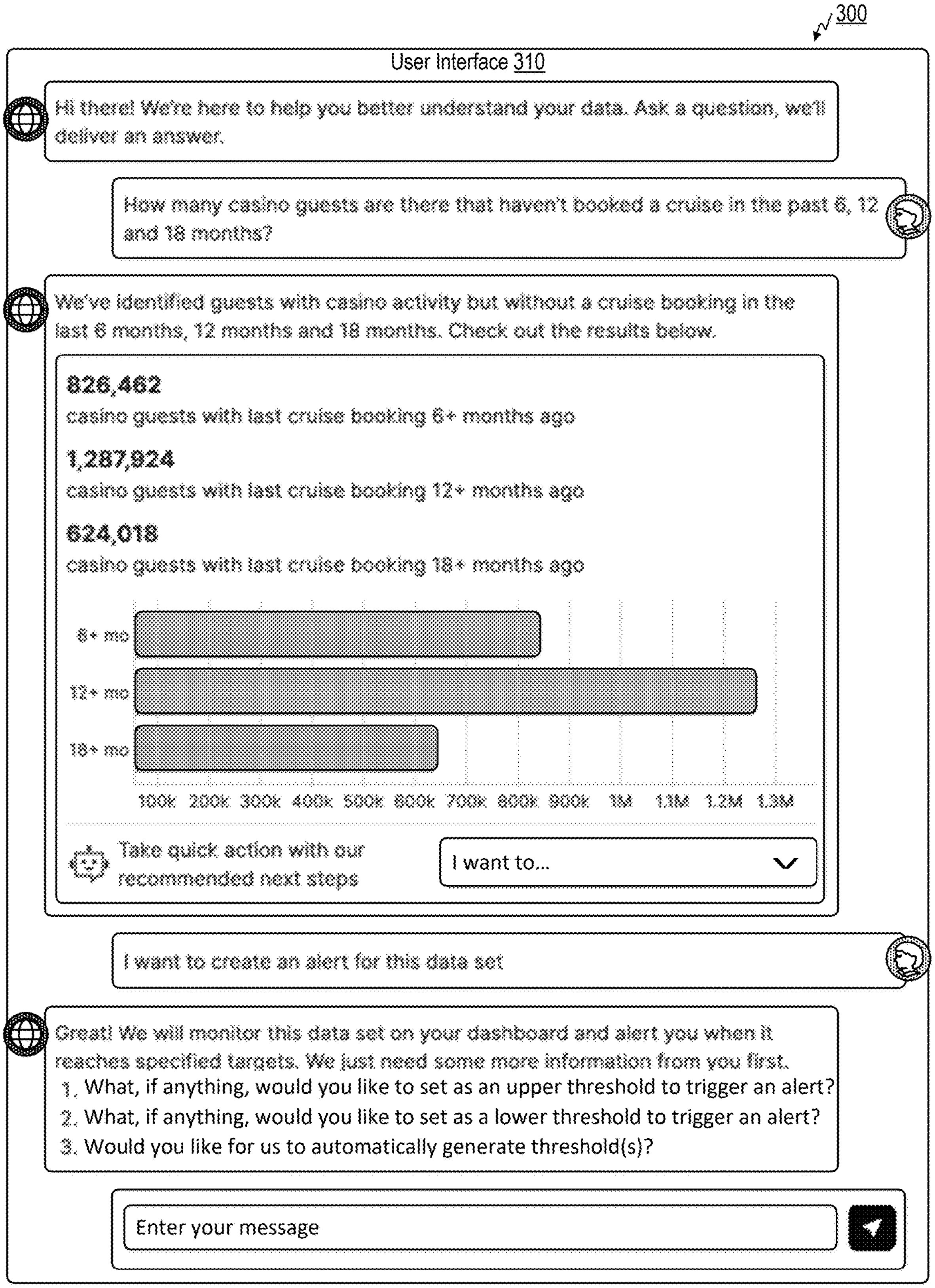
FIG. 3 is a conceptual diagram illustrating an example of a user interface in which the user requests the AI agent to track the customer type metric with respect to the data from the data set, and requests the AI agent to continue to monitor the data set and alert the user if the customer type metric reaches or crosses a target threshold, in accordance with some examples.

FIG. 3 is a conceptual diagram 300 illustrating an example of a user interface 310 in which the user requests the AI agent to track the customer type metric with respect to the data from the data set, and requests the AI agent to continue to monitor the data set and alert the user if the customer type metric reaches or crosses a target threshold. The user interface 310 illustrates a continuation of the conversation in the user interface 210. In particular, the user interface 310 is a variant of the user interface 210 after the user interface input selecting the "create an alert for this data source" option is received. The user interface 310 shows a message from the user stating I want to create an alert for this data source, indicating that the "create an alert for this data source" option (from the user interface 210) was selected. The user interface 310 includes a message from the AI agent stating that the AI agent "will monitor this data set on your dashboard and alert you when it reaches specified targets" and requesting "some more information." The AI agent then asks questions. The first question is "what, if anything, would you like to set as an upper threshold to trigger an alert?," allowing the user to set a specified upper threshold to trigger an alert if the metric reaches or crosses (e.g., exceeds) the upper threshold. The second question is "what, if anything, would you like to set as a lower threshold to trigger an alert?," allowing the user to set a specified lower threshold to trigger an alert if the metric reaches or crosses (e.g., falls below) the lower threshold. The third question is "would you like for us to automatically generate threshold(s)?," allowing the user to have the AI agent automatically generate the upper threshold(s) and/or lower threshold(s), for instance based on maximums of historic values for the metric, minimums of historic values for the metric, averages of historic values for the metric, standard deviations for the historic values for the metric, multipliers, offsets, or combinations thereof.

Figure 4:
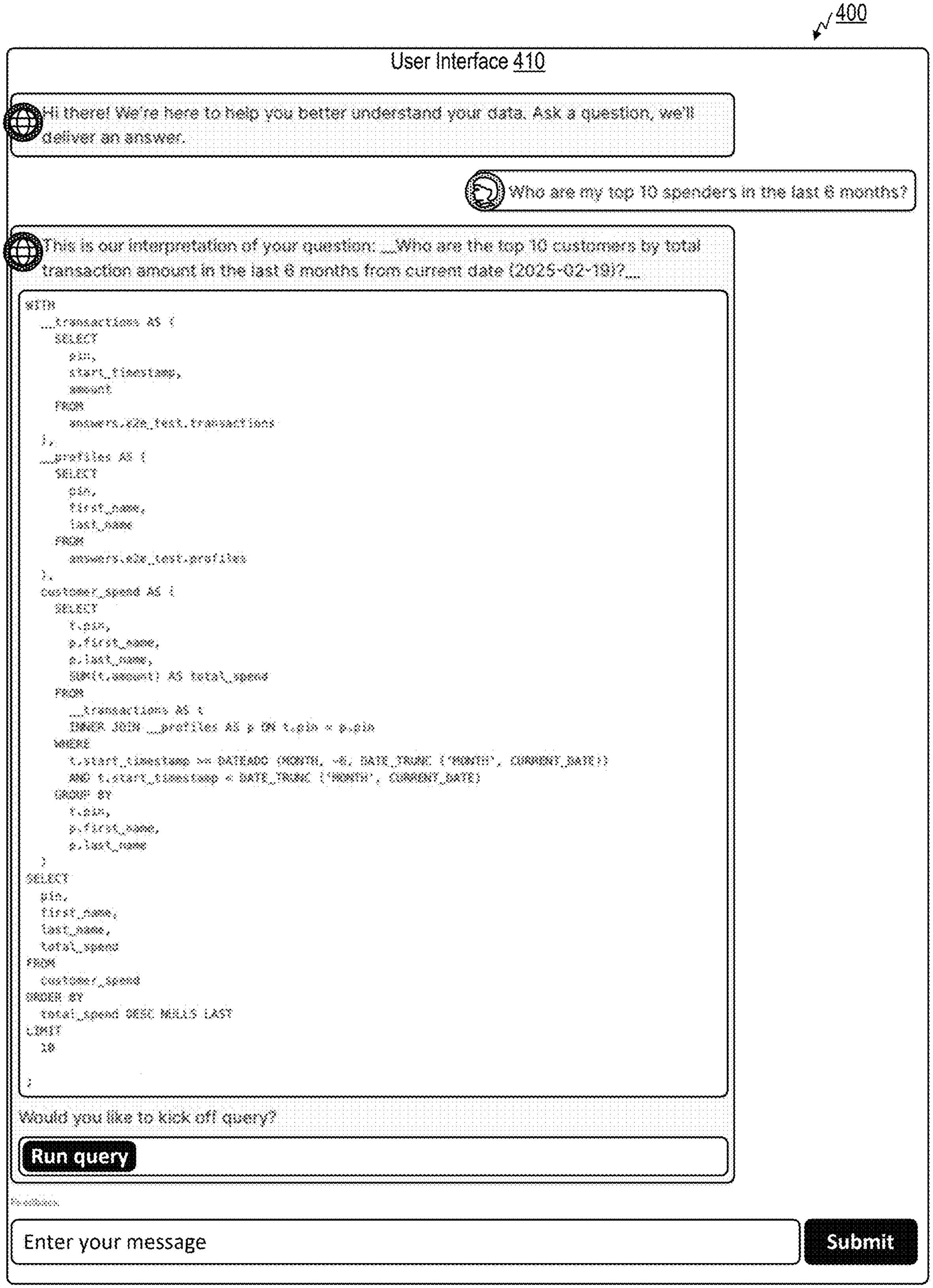
FIG. 4 is a conceptual diagram illustrating an example of a user interface in which a user requests an artificial intelligence (AI) agent to track a customer spending metric with respect to data from a data set, in accordance with some examples.

FIG. 4 is a conceptual diagram 400 illustrating an example of a user interface 410 in which a user requests an artificial intelligence (AI) agent to track a customer spending metric with respect to data from a data set. The user interface 410 is a conversational interface, such as a chat interface. After an introductory statement from the AI agent, a query from the user (e.g., which is an example of the natural language query 105) states "who are my top 10 spenders in the last 6 months?" The AI agent responds with a response stating "this is our interpretation of your question: who are the top 10 customers by total transaction amount in the last 6 months from current date (2025-02-19)?" This is a partial response, for instance showing the user a modified query with context data (e.g., from a RAQ query) added and translation layer(s) applied (e.g., by the plan orchestrator 110 and/or the plan executor 120). The AI agent's response includes a division of the user's query into sub-queries in a data serialization language, specifically YAML Ain't Markup Language (YAML). The sub-queries identify transactions, profiles (of customers), customer spending (cross-referencing the transactions with the profiles), and selection of the top 10 customers in order of total spending. This may be an example of the synthesized response 195, but may be an example of the AI agent stopping to request further information partway into generating the 195, for instance after generating the modified query, the sub-queries (e.g., sub-queries 125A-125C), and/or the actions (e.g., actions 130A-130C).

Figure 5:
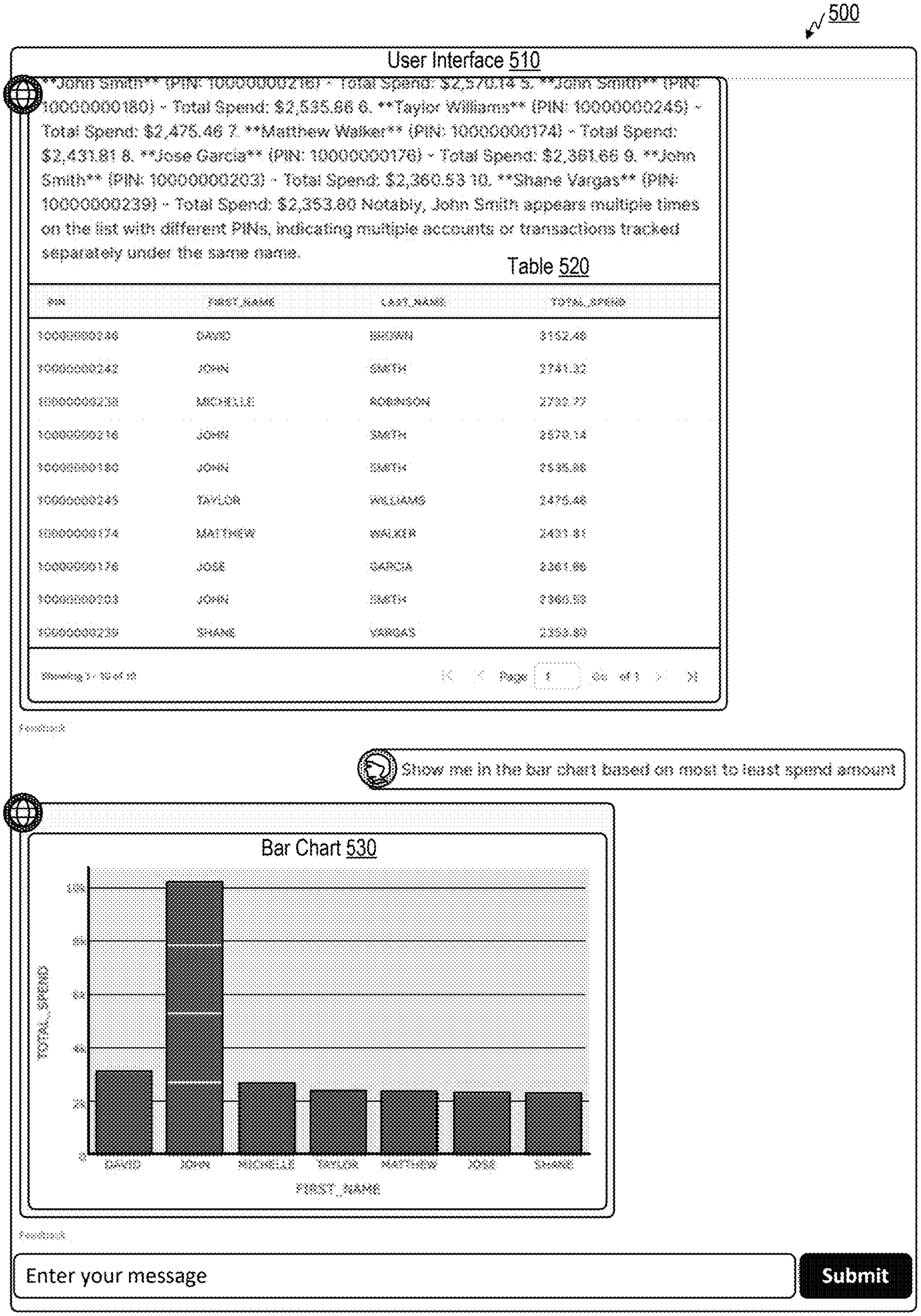
FIG. 5 is a conceptual diagram illustrating an example of a user interface in which the user requests the AI agent to track the customer spending metric with respect to the data from the data set, and requests the AI agent to visualize the tracking of the customer spending metric in a bar chart, in accordance with some examples.

FIG. 5 is a conceptual diagram 500 illustrating an example of a user interface 510 in which the user requests the AI agent to track the customer spending metric with respect to the data from the data set, and requests the AI agent to visualize the tracking of the customer spending metric in a bar chart. The user interface 510 illustrates a continuation of the conversation in the user interface 410. In particular, the user interface 510 illustrates another message from the AI agent after the final message in the user interface 410, with this message from the AI agent including amounts that different customers spent, ordered by total spend. The amounts are listed both in the text of the message and in a table 520 that is ordered by total spend. The columns in the table 520 include personal identification numbers (PIN), first name, last name, and total spend. This message can be an example of the synthesized response 195, with the table 520 in the message being an example of a visualization.

The user interface 510 illustrates another message from the user (received through the user interface 510) stating "show me in the bar chart based on most to least spend amount." The user interface 510 illustrates an additional response from the AI agent with a bar chart 530 ordered from customers with highest spend (on the left) to customers with the lowest spend (on the right). The horizontal axis of the bar chart 530 identifies different customer names. The vertical axis of the bar chart 530 measures spend amounts. This additional response from the AI agent is another example of the synthesized response 195, and the bar chart 530 is another example of a visualization.

The name "John Smith" is associated with four different PINs as indicated in the table 520 in the top response from the AI agent in the user interface 510, possibly because multiple different customers have the name "John Smith," and/or because a customer with the name "John Smith" might have multiple PINs (e.g., multiple accounts). The bar chart 530 illustrates this by stacking the four bars representing the four different total spend amounts associated with the name "John Smith" on top of one another, with white horizontal lines separating each. Because the highest total spend associated with a single PIN corresponding to a "John Smith" is still less than the total spend associated with "David Brown," the bar chart 530 illustrates the bar(s) for "John Smith" to the right of the bar for "David Brown." In some examples, the AI agent could move the bar(s) for "John Smith" to the left of the bar for "David Brown," for instance if context (e.g., retrieved via RAG query) indicates to the AI agent that the different PINs of John Smith actually belong to the same customer. In some examples, the AI agent could separate out the different bars for the name "John Smith" by PIN, for instance if context (e.g., retrieved via RAG query) indicates to the AI agent that the different PINs of John Smith actually belong to different customers.

Figure 6:
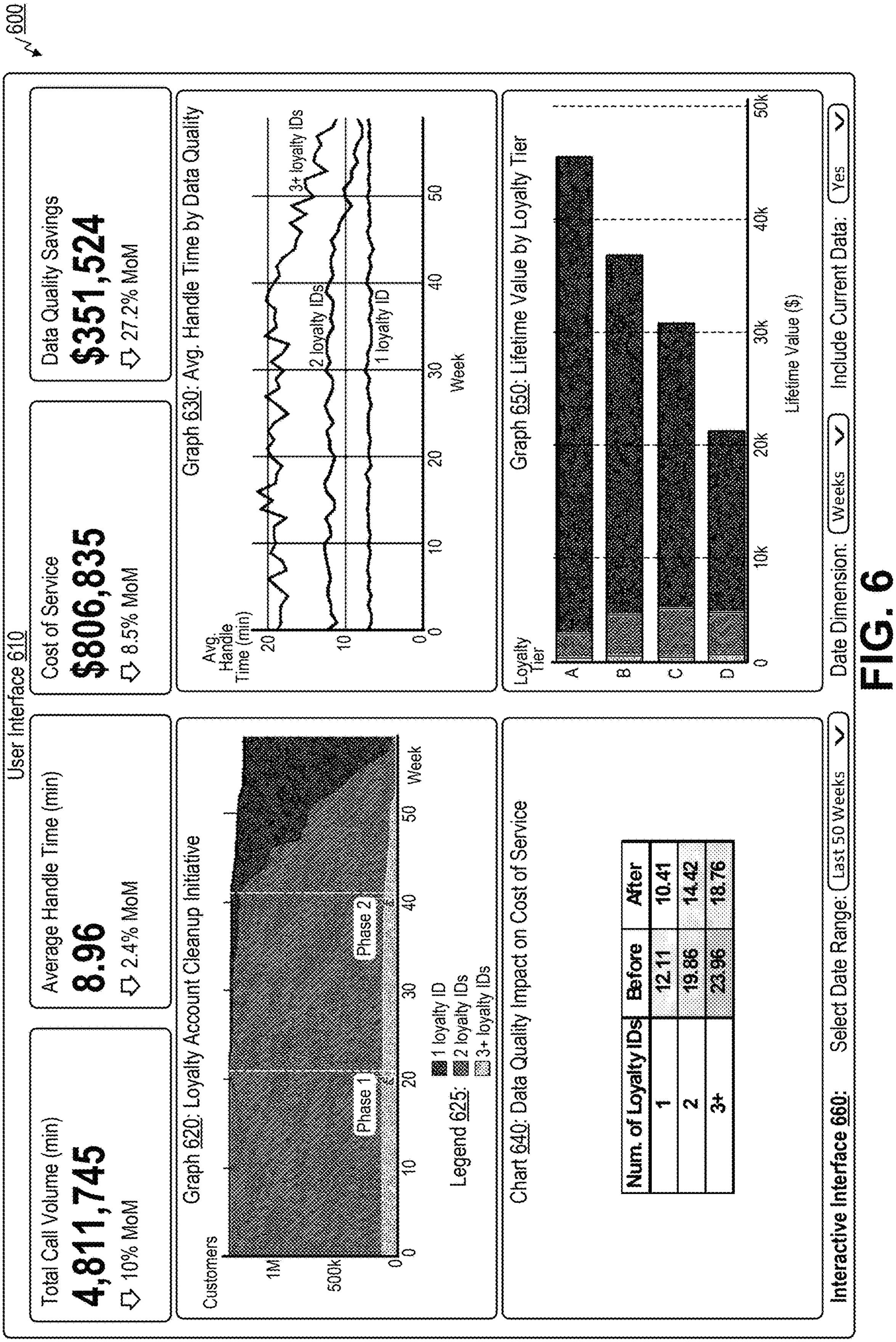
FIG. 6 is a conceptual diagram illustrating an example of a user interface for a dashboard in which multiple metrics are tracked over time, in accordance with some examples.

FIG. 6 is a conceptual diagram 600 illustrating an example of a user interface 610 for a dashboard in which multiple metrics are tracked over time. The user interface 610 tracks metrics in boxes, such as total call volume (e.g., in minutes), change in total call volume month over month (MoM), average handle time (e.g., in minutes), change in average handle time MoM, cost of service (e.g., in US dollars), change in cost of service MoM, data quality savings (e.g., in US dollars), and change in data quality savings MoM. The user interface 610 includes a number of visualizations, including a graph 620, a graph 630, a chart 640, and a graph 650. The graph 620, the graph 630, the chart 640, and the graph 650 are each examples of visualizations generated by the visualizer 185 and/or the AI engine 190.

The user interface 610 includes a graph 620 associated with a loyalty account cleanup. The graph 620 is an area graph, and tracks how the number of customers (vertical axis) that have a certain number of loyalty identifiers (IDs) (e.g., identified by different shading for 1 loyalty ID, 2 loyalty IDs, or 3+ loyalty IDs as indicated in the legend 625) changes over time (horizontal axis). The user interface 610 includes a graph 630 associated with average handle time (call handle time) by data quality. The graph 630 is a line graph, and tracks how average handle time (in minutes) (vertical axis) changes over time (horizontal axis) for customers with 1 loyalty ID (indicated by a bottom line on the graph 630), for customers with 2 loyalty IDs (indicated by a middle line on the graph 630), and for customers with 3+ loyalty ID (indicated by a top line on the graph 630).

The user interface 610 includes a chart 640 associated with lifetime value by loyalty tier. The chart 640 is a heat map, and tracks a data quality metric (with higher numbers being worse and lower numbers being better) before and after a loyalty account cleanup initiative (e.g., after zero weeks and after 50 weeks, respectively, based on the timeline used in the graph 620 and the graph 630), for customers with 1 loyalty ID (indicated by a top row in the chart 640), for customers with 2 loyalty IDs (indicated by a middle row in the chart 640), and for customers with 3+ loyalty ID (indicated by a bottom row in the chart 640). The chart 640 uses shading to share higher numbers with a darker shading and lower numbers with a lighter shading, with numbers in the middle having shading in between the two. In some examples, a similar chart 640 can use different colors along a spectrum in a similar way instead, such as green to red. The chart 640 shows improvements in the data quality metric for all three categories of user after the loyalty account cleanup initiative compared to before the loyalty account cleanup initiative.

The user interface 610 includes a graph 650 associated with average handle time (call handle time) by data quality. The graph 650 is a bar graph or bar chart, and tracks a lifetime value in US dollars (horizontal axis) for groups of customers in different loyalty tiers (vertical axis), also identifying which customers have different numbers of loyalty identifiers (IDs) (e.g., by different shading for 1 loyalty ID, 2 loyalty IDs, or 3+ loyalty IDs as indicated in the legend 625). The loyalty tiers are labeled loyalty tier A (having the highest lifetime value) loyalty tier B, loyalty tier C, and loyalty tier D (having the lowest lifetime value).

The user interface 610 includes an interactive interface 660 that can be used to dynamically update the various visualizations (e.g., the boxes at the top of the user interface 610, the graph 620, the graph 630, the chart 640, and/or the graph 650). For instance, the interactive interface 660 includes interactive elements (e.g., drop-down menus, other types of menus, buttons, checkboxes, radio buttons, or combinations thereof) that can each receive an interaction (e.g., from a user interacting with the interactive interface 660 via a user device) to change various aspects of the visualizations. The interactive interface 660 is includes an interactive dropdown menu allowing the data range (e.g., for the graph 620, the graph 630, and/or the chart 640) to be changed from a current setting (last 50 weeks) to a different setting (e.g., last 60 weeks, last 30 weeks, last 20 weeks, last 6 months, last year, last 5 years, and/or a custom data range). The interactive interface 660 is includes an interactive dropdown menu allowing the data dimension (e.g., for the graph 620, the graph 630, and/or the chart 640) to be changed from a current setting (weeks) to a different setting (e.g., hours, days, months, or years). The interactive interface 660 is includes an interactive dropdown menu allowing whether the visualizations include current data or not to be changed from a current setting (yes) to a different setting (e.g., no).

Figure 7:
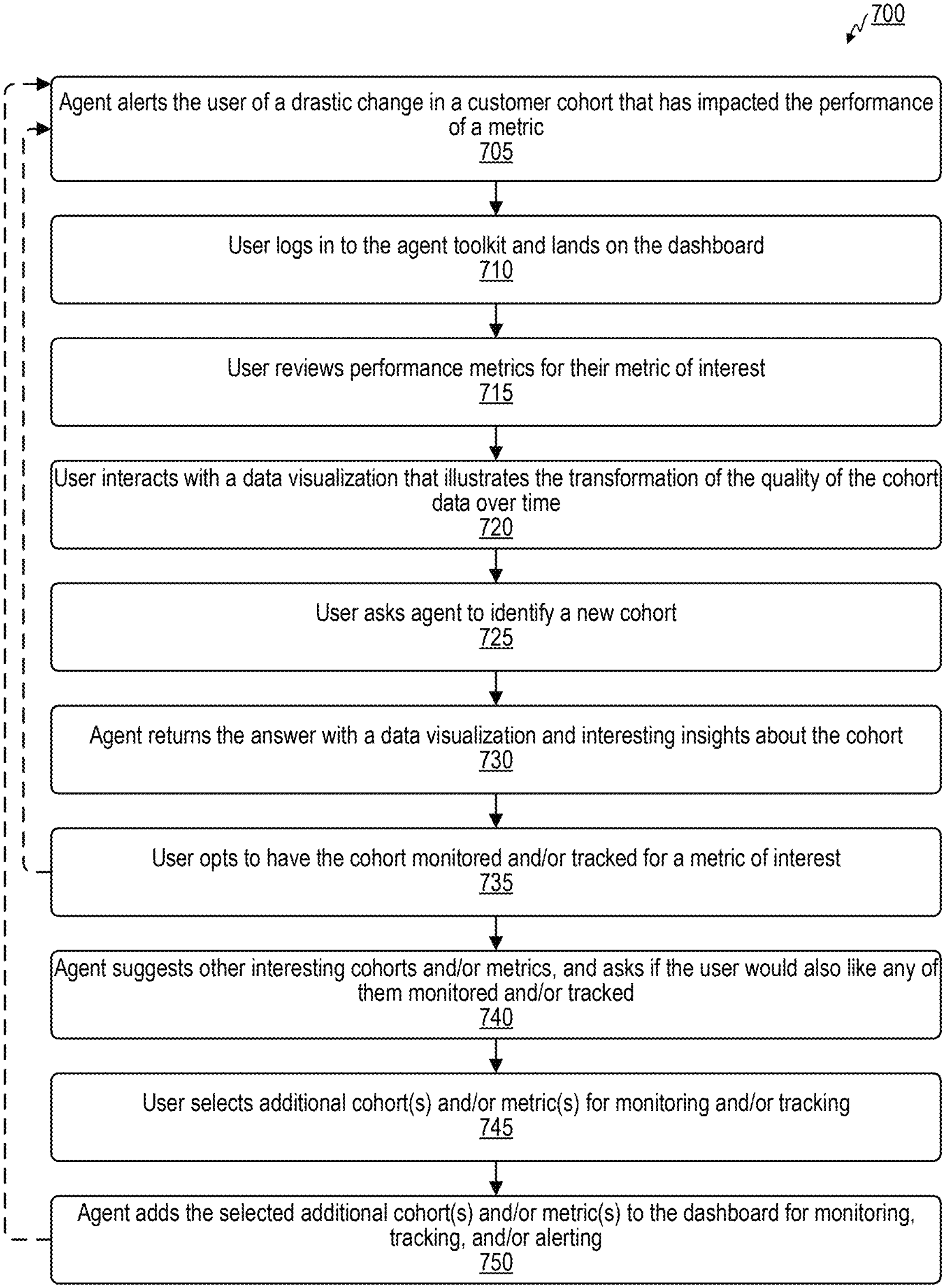
FIG. 7 is a flow diagram illustrating a process corresponding to a user and AI agent conversational workflow, in accordance with some examples.

FIG. 7 is a flow diagram illustrating a process 700 corresponding to a user and AI agent conversational workflow. The process 700 can be performed by an interfacing system, such as the responsive interfacing system 100, a system with the user interface 210, a system with the user interface 310, a system with the user interface 410, a system with the user interface 510, a system with the user interface 610, the machine learning system 800, the RAG system 900, a system that performs the process 1000, the responsive interfacing system that performs the process 1100, the metric tracking system that performs the process 1200, a computer system 1300, a computing device, an apparatus, a processor executing instructions stored in a memory, a processor executing instructions stored in a non-transitory computer-readable storage medium, a component or subsystem of any of these systems, or a combination thereof.

At operation 705, the AI agent alerts the user (e.g., through a user interface) of a drastic change (e.g., reaching or crossing a threshold) in a customer cohort that has impacted the performance of a metric (e.g., a KPI). At operation 710, the user logs in to the AI agent toolkit (e.g., through the user interface) and lands on the dashboard (e.g., the dashboard user interface 610). At operation 715, the user reviews performance metrics for their metric of interest (e.g., the KPI). At operation 720, the user views (and/or otherwise interacts with) a data visualization that illustrates the transformation of the quality of the cohort data over time.

At operation 725, the user asks the AI agent (e.g., through a user interface) to identify a new cohort (e.g., as a new natural language query 105). At operation 730, the AI agent returns the answer with a data visualization and interesting insights about the cohort (e.g., as a synthesized response 195). At operation 735, the user opts (e.g., through the user interface) to have the cohort monitored and/or tracked for a metric of interest (e.g., similarly to the user interface 210 and/or the user interface 310). In some examples, the process 700 can return to operation 705 after operation 735, for instance where the AI agent alerts the user when this metric of interest (e.g., KPI) reaches or crosses a threshold.

At operation 740, the AI agent suggests other interesting cohorts and/or metrics, and asks (e.g., through a user interface) if the user would also like any of them monitored and/or tracked. At operation 745, the user selects (e.g., through the user interface) additional cohort(s) and/or metric (s) for monitoring and/or tracking. At operation 750, the AI agent adds the selected additional cohort(s) and/or metric(s) to the dashboard for monitoring, tracking, and/or alerting. In some examples, the process 700 can return to operation 705 after operation 750, for instance where the AI agent alerts the user when one of these metrics of interest (e.g., KPI) reaches or crosses a threshold for one of these cohort(s).

Figure 8:
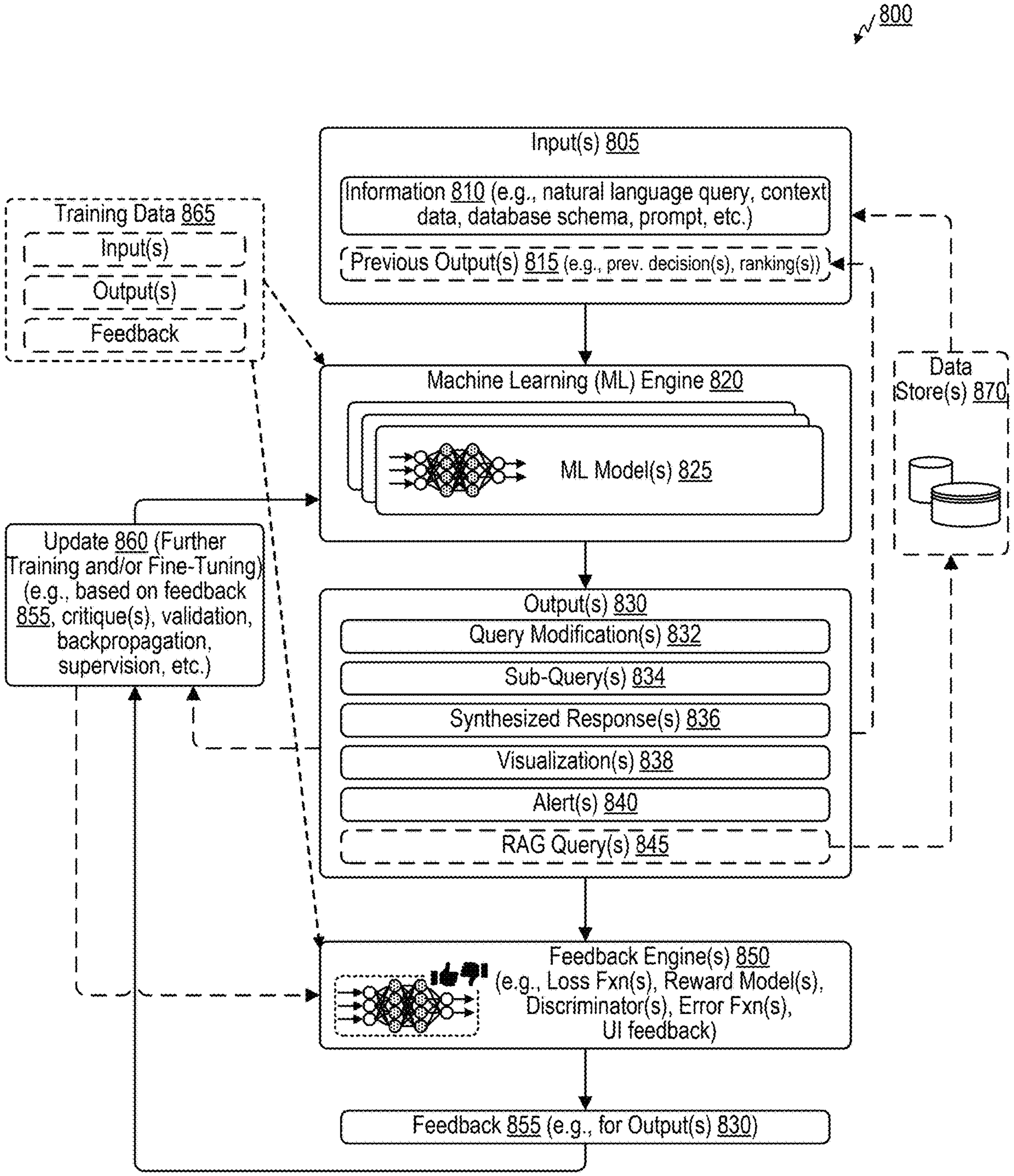
FIG. 8 is a block diagram illustrating an example of a machine learning system for training, use of, and/or updating of one or more machine learning model(s) that are used to generate query modification(s), sub-query(s), synthesized response(s), visualization(s), retrieval augmented generation (RAG) query(s), other types of output(s), or a combination thereof, in accordance with some examples.

FIG. 8 is a block diagram illustrating an example of a machine learning system 800 for training, use of, and/or updating of one or more machine learning model(s) 825 that are used to generate query modification(s) 832, sub-query(s) 834, synthesized response(s) 836, visualization(s) 838, alert(s) 840, retrieval augmented generation (RAG) query(s) 845, other types of output(s) 830, or a combination thereof. The machine learning (ML) system 800 includes an ML engine 820 that generates, trains, uses, and/or updates one or more ML model(s) 825. In some examples, AI engine 115, the AI engine 135, the AI engine 180, the AI engine 190, and/or the AI agent(s) of FIGS. 2-7, include the ML system 800, the ML engine 820, the ML model(s) 825, and/or the feedback engine(s) 850, or vice versa.

The ML model(s) 825 can include, for instance, one or more neural network(s) (NN(s)), one or more convolutional NN(s) (CNN(s)), one or more time delay NN(s) (TDNN(s)), one or more deep network(s) (DN(s)), one or more autoencoder(s) (AE(s)), one or more variational autoencoder(s) (VAE(s)), one or more deep belief net(s) (DBN(s)), one or more recurrent NN(s) (RNN(s)), one or more generative adversarial network(s) (GAN(s)), one or more conditional GAN(s) (cGAN(s)), one or more feed-forward network(s), one or more network(s) having fully connected layers, one or more support vector machine(s) (SVM(s)), one or more random forest(s) (RF), one or more computer vision (CV) system(s), one or more autoregressive (AR) model(s), one or more Sequence-to-Sequence (Seq2Seq) model(s), one or more large language model(s) (LLM(s)), one or more deep learning system(s), one or more classifier(s), one or more transformer(s), or a combination thereof.

In some examples, the ML model(s) 825 can include a U-Network (U-Net) structure and/or architecture that includes a contracting path and an expansive path. If the ML model(s) 825 is a U-Net, the ML model(s) 825 may include, for instance, combination of convolution, up-convolution, pooling and skip connections that allows the ML model(s) 825 to extract and capture complex features, while also keeping and reconstructing spatial information.

In examples where the ML model(s) 825 include LLMs, the LLMs can include, for instance, a Generative Pre-Trained Transformer (GPT) (e.g., GPT-2, GPT-3, GPT-3.5, GPT-4, etc.), DaVinci or a variant thereof, an LLM using Massachusetts Institute of Technology (MIT)® langchain, Pathways Language Model (PaLM), Large Language Model Meta® AI (LLaMA), Language Model for Dialogue Applications (LaMDA), Bidirectional Encoder Representations from Transformers (BERT), Falcon (e.g., 40B, 7B, 1B), Orca, Phi-1, StableLM, DeepSeek® R1, Alibaba® Qwen®, ByteDance® Doubao®, another LLM, variant(s) of any of the previously-listed LLMs, or a combination thereof.

Within FIG. 8, a graphic representing the ML model(s) 825 illustrates a set of circles connected to one another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. An ML model can include more or fewer hidden layers than the two illustrated, but includes at least one hidden layer. In some examples, the layers and/or nodes represent interconnected filters, and information associated with the filters is shared among the different layers with each layer retaining information as the information is processed. The lines between nodes can represent node-to-node interconnections along which information is shared. The lines between nodes can also represent weights (e.g., numeric weights) between nodes, which can be tuned, updated, added, and/or removed as the ML model(s) 825 are trained and/or updated. In some cases, certain nodes (e.g., nodes of a hidden layer) can transform the information of each input node by applying activation functions (e.g., filters) to this information, for instance applying convolutional functions, downscaling, upscaling, data transformation, and/or any other suitable functions.

In some examples, the ML model(s) 825 can include a feed-forward network, in which case there are no feedback connections where outputs of the network are fed back into itself. In some cases, the ML model(s) 825 can include a recurrent neural network, which can have loops that allow information to be carried across nodes while reading in input. In some cases, the network can include a convolutional neural network, which may not link every node in one layer to every other node in the next layer.

One or more input(s) 805 can be provided to the ML model(s) 825. The ML model(s) 825 can be trained by the ML engine 820 (e.g., based on training data 865) to generate one or more output(s) 830. In some examples, the input(s) 805 include information 810. The information 810 can include, for instance, the natural language query 105, context data, a conversation history, a transaction history, the semantic model 140, the synonyms 145, the expressions 150, the relationships 155, the filters 160, the verified queries 165, the results of a search 170, other types of input data discussed herein, or a combination thereof. In some examples, the input(s) 805 can include prompt(s) (e.g., to an LLM). In some examples, the input(s) 805 can include information retrieved from data store(s) 870, for instance via retrieval augmented generation (RAG) (e.g., via RAG query(s) 845). In some examples, the input(s) 805 can include prompt(s) that are modified and/or enhanced using information retrieved from data store(s) 870, for instance via retrieval augmented generation (RAG) (e.g., via RAG query(s) 845).

The output(s) 830 that ML model(s) 825 generate by processing the input(s) 805 (e.g., the information 810 and/or the previous output(s) 815) can include query modification(s) 832, sub-query(s) 834, response(s) 836, visualization(s) 838, alert(s) 840, and/or RAG query(s) 845. The query modification(s) 832 can include, for instance, additions of context data (e.g., retrieved via RAG query(s) 845) to the natural language query, translations or conversions of certain terms in the natural language query to other terms (e.g., synonyms) that align with a database schema, other modifications to a query, or a combination thereof. The sub-query(s) 834 can include, for instance, queries that correspond to a subset of a query, for instance asking questions needed to answer the larger question in the query. In some examples, the sub-query(s) 834 include natural language queries. In some examples, the sub-query(s) 834 include data structure queries, such as database queries. Database queries can include, for instance, Structured Query Language (SQL) queries. The response(s) 836 can include the synthesized response 195 generated by the synthesizer 175 and/or the visualizer 185, such as any of the examples of responses in FIGS. 2-7. The visualization(s) 838 include the visualization generated by the visualizer 185, such as any of the examples of visualizations in FIGS. 2-6. The alert(s) 840 can include alerts triggered when a specific metric reaches or crosses a threshold, for instance including a message indicating to the user that a specific metric "has exceeded an upper threshold," "has fallen below a lower threshold," or the like. The ML model(s) 825 can generate the each of the output(s) 830 based on the information 810, information from the data store(s) 870, and/or other types of input(s) 805 (e.g., previous output(s) 815).

In some examples, the ML model(s) 825 can identify something in the input(s) 805 about which the data store(s) 870 include additional information, and can fashion at least one query (e.g., the RAG query(s) 845) for the data store(s) 870 to retrieve the additional information from the data store(s) 870. For instance, if the information 810 references a specific model of device, the RAG query(s) 845 can include one or more queries of the data store(s) 870 for additional information about the specific model of device, for instance to retrieve its components, configurations, settings, firmware updates, ranges of optimal operating parameters (e.g., temperature, clock speed, and so forth), or a combination thereof. The additional information retrieved from the data store(s) 870 using the RAG query(s) 845 can be used as part of the input(s) 805 (e.g., as part of the information 810 and/or part of the previous output(s) 815) for further passes of data processing by the ML model(s) 825.

In some examples, certain output(s) 830 (e.g., the query modification(s) 832, the sub-query(s) 834, the response(s) 836, the visualization(s) 838, the alert(s) 840, the RAG query(s) 845) can be used as part of the input(s) 805 to the ML model(s) 825 (e.g., as part of previous output(s) 815) for identifying other output(s) 830. For instance, in an illustrative example, the query modification(s) 832 can be processed, as previous output(s) 815, by the ML model(s) 825 to generate the sub-query(s) 834, the response(s) 836, the visualization(s) 838, the alert(s) 840, the RAG query(s) 845, and/or other output(s) 830. In some examples, at least some of the previous output(s) 815 in the input(s) 805 represent previously-identified instances of some of the output(s) 830 that are input into the ML model(s) 825 to generate other types of the output(s) 830. In some examples, based on receipt of the input(s) 805, the ML model(s) 825 can select the output(s) 830 from a list of possible outputs, for instance by ranking the list of possible outputs by likelihood, probability, and/or confidence based on the input(s) 805. In some examples, based on receipt of the input(s) 805, the ML model(s) 825 can identify the output(s) 830 at least in part using generative artificial intelligence (AI) content generation techniques, for instance using an LLM to generate custom text and/or graphics identifying the output(s) 830. In some examples, the LLM-based output(s) 830 are conversationally responsive to a prompt in the input(s) 805 (e.g., in the information 810 and/or in the previous output(s) 815).

In some examples, the ML system repeats the process illustrated in FIG. 8 multiple times to generate the output(s) 830 in multiple passes, using some of the output(s) 830 from earlier passes as some of the input(s) 805 in later passes (e.g., as some of the previous output(s) 815). For instance, in a first illustrative example, in a first pass, the ML model(s) 825 can identify the query modification(s) 832 based on input of the information 810 into the ML model(s) 825. In a second pass, the ML model(s) 825 can identify the sub-query(s) 834 based on input of the information 810 and the previous output(s) 815 (that includes the query modification(s) 832 from the first pass) into the ML model(s) 825. In a third pass, the ML model(s) 825 can identify the response(s) 836 and/or the visualization(s) 838 based on input of the information 810 and the previous output(s) 815 (that includes the query modification(s) 832 and/or the sub-query(s) 834 from the previous passes) into the ML model(s) 825. In a fourth pass, the ML model(s) 825 can identify the alert(s) 840 based on input of the information 810 and the previous output(s) 815 (that includes the query modification(s) 832, the sub-query(s) 834, the response(s) 836, and/or the visualization(s) 838 from the previous passes) into the ML model(s) 825.

In some examples, the ML system includes one or more feedback engine(s) 850 that generate and/or provide feedback 855 about the output(s) 830. In some examples, the feedback 855 indicates how well the output(s) 830 align to corresponding expected output(s), how well the output(s) 830 serve their intended purpose, or a combination thereof. In some examples, the feedback engine(s) 850 include loss function(s), reward model(s) (e.g., other ML model(s) that are used to query modification the output(s) 830), discriminator(s), error function(s) (e.g., in back-propagation), user interface feedback received via a user interface from a user, or a combination thereof. In some examples, the feedback 855 can include one or more alignment query modification(s) that query modification a level of alignment between the output(s) 830 and the expected output(s) and/or intended purpose.

The ML engine 820 of the ML system can update (further train) the ML model(s) 825 based on the feedback 855 to perform an update 860 (e.g., further training) of the ML model(s) 825 based on the feedback 855. In some examples, the feedback 855 includes positive feedback, for instance indicating that the output(s) 830 closely align with expected output(s) and/or that the output(s) 830 serve their intended purpose. In some examples, the feedback 855 includes negative feedback, for instance indicating a mismatch between the output(s) 830 and the expected output(s), and/or that the output(s) 830 do not serve their intended purpose. For instance, high amounts of loss and/or error (e.g., exceeding a threshold) can be interpreted as negative feedback, while low amounts of loss and/or error (e.g., less than a threshold) can be interpreted as positive feedback. Similarly, high amounts of alignment (e.g., exceeding a threshold) can be interpreted as positive feedback, while low amounts of alignment (e.g., less than a threshold) can be interpreted as negative feedback.

In response to positive feedback in the feedback 855, the ML engine 820 can perform the update 860 to update the ML model(s) 825 to strengthen and/or reinforce weights (and/or connections and/or hyperparameters) associated with generation of the output(s) 830 to encourage the ML engine 820 to generate similar output(s) 830 given similar input(s) 805. In this way, the update 860 can improve the ML model(s) 825 itself by improving the accuracy of the ML model(s) 825 in generating output(s) 830 that are similarly accurate given similar input(s) 805. In response to negative feedback in the feedback 855, the ML engine 820 can perform the update 860 to update the ML model(s) 825 to weaken and/or remove weights (and/or connections and/or hyperparameters) associated with generation of the output(s) 830 to discourage the ML engine 820 from generating similar output(s) 830 given similar input(s) 805. In this way, the update 860 can improve the ML model(s) 825 itself by improving the accuracy of the ML model(s) 825 in generating output(s) 830 are more accurate given similar input(s) 805. In some examples, for instance, the update 860 can improve the accuracy of the ML model(s) 825 in generating output(s) 830 by reducing false positive(s) and/or false negative(s) in the output(s) 830.

For instance, here, if the query modification(s) 832 and/or sub-query(s) 834 are used to generate a response(s) 836, a visualization(s) 838, and/or an alert(s) 840, and the generation is successful (e.g., accurate and/or causes no error), the success of the generation can be interpreted as feedback 855 that is positive (e.g., positive feedback). On the other hand, if the query modification(s) 832 and/or sub-query(s) 834 are used to generate a response(s) 836, a visualization(s) 838, and/or an alert(s) 840, and the generation fails or is unsuccessful (e.g., inaccurate or causes an error), the failure or lack of success of the generation can be interpreted as feedback 855 that is negative (e.g., negative feedback). Either way, the update 860 can improve the machine learning system 800 and the overall system by improving the consistency with which the generation is successful (e.g., accurate and/or reliable without error).

In some examples, the ML engine 820 can also perform an initial training of the ML model(s) 825 before the ML model(s) 825 are used to generate the output(s) 830 based on the input(s) 805. During the initial training, the ML engine 820 can train the ML model(s) 825 based on training data 865. In some examples, the training data 865 includes examples of input(s) (of any input types discussed with respect to the input(s) 805), output(s) (of any output types discussed with respect to the output(s) 830), and/or feedback (of any feedback types discussed with respect to the feedback 855). In some cases, positive feedback in the training data 865 can be used to perform positive training, to encourage the ML model(s) 825 to generate output(s) similar to the output(s) in the training data given input of the corresponding input(s) in the training data. In some cases, negative feedback in the training data 865 can be used to perform negative training, to discourage the ML model(s) 825 from generating output(s) similar to the output(s) in the training data given input of the corresponding input(s) in the training data. In some examples, the training of the ML model(s) 825 (e.g., the initial training with the training data 865, update(s) 860 based on the feedback 855, and/or other modification(s)) can include fine-tuning of the ML model(s) 825, retraining of the ML model(s) 825, or a combination thereof.

In some examples, the ML model(s) 825 can include an ensemble of multiple ML models, and the ML engine 820 can curate and manage the ML model(s) 825 in the ensemble. The ensemble can include ML model(s) 825 that are different from one another to produce different respective outputs, which the ML engine 820 can average (e.g., mean, median, and/or mode) to identify the output(s) 830. In some examples, the ML engine 820 can calculate the standard deviation of the respective outputs of the different ML model(s) 825 in the ensemble to identify a level of confidence in the output(s) 830. In some examples, the standard deviation can have an inverse relationship with confidence. For instance, if the respective outputs of the different ML model(s) 825 are very different from one another (and thus have a high standard deviation above a threshold), the confidence that the output(s) 830 are accurate may be low (e.g., below a threshold). On the other hand, if the respective outputs of the different ML model(s) 825 are equal or very similar to one another (and thus have a low standard deviation below a threshold), the confidence that the output(s) 830 are accurate may be high (e.g., above a threshold).

In some examples, different ML models(s) 825 in the ensemble can include different types of models. For instance, in some examples, an ensemble can include a NN and a SVM that are both trained to process the input(s) 805 to generate at least a subset of the output(s) 830. In some examples, the ensemble may include different ML model(s) 825 that are trained to process different inputs of the input(s) 805 and/or to generate different outputs of the output(s) 830. For instance, in some examples, a first model (or set of models) can process the input(s) 805 to generate the query modification(s) 832, a second model (or set of models) can process the input(s) 805 to generate the sub-query(s) 834, a third model (or set of models) can process the input(s) 805 to generate the response(s) 836, a fourth model (or set of models) can process the input(s) 805 to generate the visualization(s) 838, a fifth model (or set of models) can process the input(s) 805 to generate the alert(s) 840, and a sixth model (or set of models) can process the input(s) 805 to generate the RAG query(s) 845. In some examples, the ML engine 820 can choose specific ML model(s) 825 to be included in the ensemble because the chosen ML model(s) 825 are effective at accurately processing particular types of input(s) 805, are effective at accurately generating particular types of output(s) 830, are generally accurate, process input(s) 805 quickly, generate output(s) 830 quickly, are computationally efficient, have higher or lower degrees of uncertainty than other models in the ensemble, or a combination thereof.

In some examples, one or more of the ML model(s) 825 can be initialized with weights, connections, and/or hyperparameters that are selected randomly. This can be referred to as random initialization. These weights, connections, and/or hyperparameters are modified over time through training (e.g., initial training with the training data 865 and/or update(s) 860 based on the feedback 855), but the random initialization can still influence the way the ML model(s) 825 process data, and thus can still cause different ML model(s) 825 (with different random initializations) to produce different output(s) 830. Thus, in some examples, different ML model(s) 825 in an ensemble can have different random initializations.

As an ML model (of the ML model(s) 825) is trained (e.g., along the initial training with the training data 865, update(s) 860 based on the feedback 855, and/or other modification(s)), different versions of the ML model at different stages of training can be referred to as checkpoints. In some examples, after each new update to a model (e.g., update 860) generates a new checkpoint for the model, the ML engine 820 tests the new checkpoint (e.g., against testing data and/or validation data where the correct output(s) are known) to identify whether the new checkpoint improves over older checkpoints or not, and/or if the new checkpoint introduces new errors (e.g., false positive(s) and/or false negative(s)). This testing can be referred to as checkpoint benchmark scoring. In some examples, in checkpoint benchmark scoring, the ML engine 820 produces a benchmark query modification for one or more checkpoint(s) of one or more ML model(s) 825, and keeps the checkpoint(s) that have the best (e.g., highest or lowest) benchmark query modifications in the ensemble. In some examples, if a new checkpoint is worse than an older checkpoint, the ML engine 820 can revert to the older checkpoint. The benchmark query modification for a can represent a level of accuracy of the checkpoint and/or number of errors (e.g., false positive or false negative) by the checkpoint during the testing (e.g., against the testing data and/or the validation data). In some examples, an ensemble of the ML model(s) 825 can include multiple checkpoints of the same ML model.

In some examples, the ML model(s) 825 can be modified, either through the initial training (with the training data 865), an update 860 based on the feedback 855, or another modification to introduce randomness, variability, and/or uncertainty into an ensemble of the ML model(s) 825. In some examples, such modification(s) to the ML model(s) 825 can include dropout (e.g., Monte Carlo dropout), in which one or more weights or connections are selected at random and removed. In some examples, dropout can also be performed during inference, for instance to modify the output(s) 830 generated by the ML model(s) 825. The term Bayesian Machine Learning (BML) can refer to random dropout, random initialization, and/or other randomization-based modifications to the ML model(s) 825. In some examples, the modification(s) to the ML model(s) 825 can include a hyperparameter search and/or adjustment of hyperparameters. The hyperparameter search can involve training and/or updating different ML models 825 with different values for hyperparameters and evaluating the relative performance of the ML models 825 (e.g., against testing data and/or validation data where the correct output(s) are known) to identify which of the ML models 825 performs best. Hyperparameters can include, for instance, temperature (e.g., influencing level creativity and/or randomness), top P (e.g., influencing level creativity and/or randomness), frequency penalty (e.g., to prevent repetitive language between one of the output(s) 830 and another), presence penalty (e.g., to encourage the ML model(s) 825 to introduce new data in the output(s) 830), other parameters or settings, or a combination thereof.

In some examples, the ML engine 820 can perform retrieval-augmented generation (RAG) using the model(s) 825. For instance, in some examples, the ML engine 820 can pre-process the input(s) 805 by retrieving additional information from one or more data store(s) 870 (e.g., any of the databases and/or other data structures discussed herein) and using the additional information to enhance the input(s) 805 before the input(s) 805 are processed by the ML model(s) 825 to generate the output(s) 830. For instance, in some examples, the enhanced versions of the input(s) 805 can include the additional information that the ML engine 820 retrieved from the one or more data store(s) 870. In some examples, the machine learning system 800 can retrieve the additional information from one or more data store(s) 870 by querying the data store(s) 870 using RAG query(s) 845 generated by the ML model(s) 825 (or extracted from the input(s) 805 using the ML model(s) 825). In some examples, this RAG process provides the ML model(s) 825 with more relevant information, allowing the ML model(s) 825 to generate more accurate and/or personalized output(s) 830.

Figure 9:
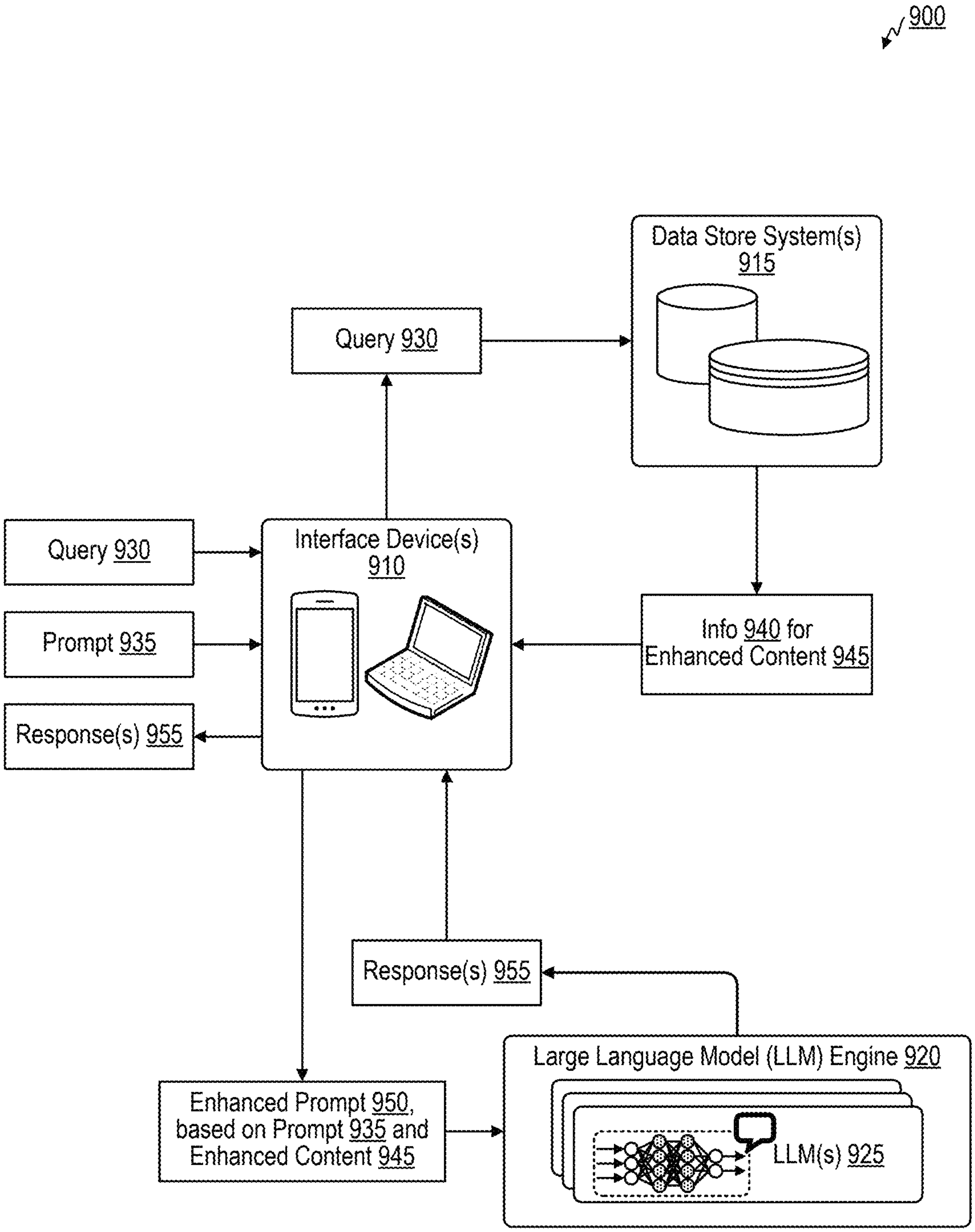
FIG. 9 is a block diagram illustrating a RAG system that may be used to implement some aspects of the technology, in accordance with some examples.

FIG. 9 is a block diagram illustrating a RAG system that may be used to implement some aspects of the technology. The RAG system 900 includes one or more interface device(s) 910 that can receive input(s) from a user and/or a user device, for instance by receiving a query 930 and/or a prompt 935 from the user and/or the system. The natural language query 105 can be an example of the prompt 935. The query 930 can be an example of the RAG query(s) 845 and/or a sub-query about a specific term in the natural language query 105 (e.g., in the prompt 935).

The interface device(s) 910 can send the query 930 to one or more data store system(s) 915 that include, and/or that have access to (e.g., over a network connection), various data store(s) (e.g., database(s), table(s), spreadsheet(s), tree(s), ledger(s), heap(s), and/or other data structure(s)). The data store system(s) 915 searches the data store(s) according to the query 930. In some examples, the interface device(s) 910 and/or the system(s) 915 convert the query 930 into tensor format (e.g., vector format and/or matrix format). In some examples, the data store system(s) 915 searches the data store(s) according to the query 930 by matching the query 930 with data in tensor format (e.g., vector format and/or matrix format) stored in the data store(s) that are accessible to the data store system(s) 915. The data store system(s) 915 retrieve, from the data store(s) and based on the query 930, information 940 that is relevant to generating enhanced content 945.

In some examples, the data store system(s) 915 provide the information 940 and/or the enhanced content 945 to the interface device(s) 910. In some examples, the data store system(s) 915 provide the information 940 to the interface device(s) 910, and the interface device(s) 910 generate the enhanced content 945 based on the information 940. The interface device(s) 910 provides the query 930, the prompt 935, the information 940, the enhanced content 945, and/or enhanced prompt 950 based on prompt 935 and enhanced content 945 to one or more LLM(s) 925 (e.g., ML model(s) 825) of an LLM engine 920 (e.g., ML engine 820). The LLM(s) 925 generate response(s) 955 that are responsive to the prompt 935. In some examples, the response(s) 955 may be, or may include, details and/or additional details of an object that the query is based on.

In some examples, the LLM(s) 925 generate the response (s) 955 (e.g., including the details of an object) based on the query 930, the prompt 935, the information 940, the enhanced content 945, and/or the enhanced prompt 950. In some examples, the LLM(s) 925 generate the response(s) 955 to include, or be based on, the information 940 and/or the enhanced content 945. The LLM(s) 925 provides the response(s) 955 to the interface device(s) 910. In some examples, the interface device(s) 910 output the response(s) 955 to the user (e.g., to the user device of the user) that provided the query 930 and/or the prompt 935. In some examples, the interface device(s) 910 output the response(s) 955 to the system (e.g., the other ML model) that provided the query 930 and/or the prompt 935 to the interface device(s) 910. In some examples, the data store system(s) 915 may include one or more ML model(s) that are trained to perform the search of the data store(s) based on the query 930.

In some examples, the system(s) 915 provides the information 940 and/or the enhanced content 945 directly to the LLM(s) 925, and the interface device(s) 910 provide the query 930 and/or the prompt 935 to the LLM(s) 925. The LLM engine 920 may be an example of the ML engine 820, or vice versa. The LLM(s) 925 may be example(s) of the AI engine(s) 115, the AI engine(s) 135, the AI engine(s) 180, the AI engine(s) 190, and/or the ML model(s) 825, or vice versa.

The data store system(s) 915 can output this information 940 to the interface device(s) 910 and/or the LLM engine 920. The data store system(s) 915, the interface device(s) 910, and/or the LLM engine 920 can modify the prompt 935 to add the enhanced content 945 and thereby generate the enhanced prompt 950. In some examples, the data store system(s) 915, the interface device(s) 910, and/or the LLM engine 920 adds or appends the information 940 and/or enhanced content 945 to the prompt 935 and/or the query 930 to generate the enhanced prompt 950. The data store system(s) 915, device(s) 910, and/or LLM engine 920 process the enhanced prompt 950 using the LLM(s) 925 to generate the response(s) 955. The response(s) 955 can be an example of the synthesized response 195. In some cases, the response(s) 955 can include visualizations (e.g., as generated by the visualizer 185).

In an illustrative example, the interface device(s) 910 may receive the prompt 935 as a natural language query 105 requesting information about a particular vehicle. The device(s) 910 extracts and/or generates the query 930 with the name of the particular vehicle, and initiates a query of the data store system(s) 915 using the query 930 to retrieve information 940 for enhanced content 945 indicating a list of components of the vehicle, a list of different models of the vehicle, a list of different colors the vehicle is available in, a top speed of the vehicle, a list of different standards the vehicle meets, a description of the vehicle, and/or other context data about the vehicle. The data store system(s) 915, the device(s) 910, the LLM engine 920, and/or another system can modify or enhance the prompt 935 to generate an enhanced prompt 950 that includes the enhanced content 945 (e.g., the additional context data about the vehicle). This enhanced prompt 950 is then processed using the LLM(s) 925 to generate the response(s) 955. In some examples, the LLM(s) 925 can use the information 940 and/or the enhanced content 945 (that is in the enhanced prompt 950) to help generate the response(s) 955.

Figure 10:
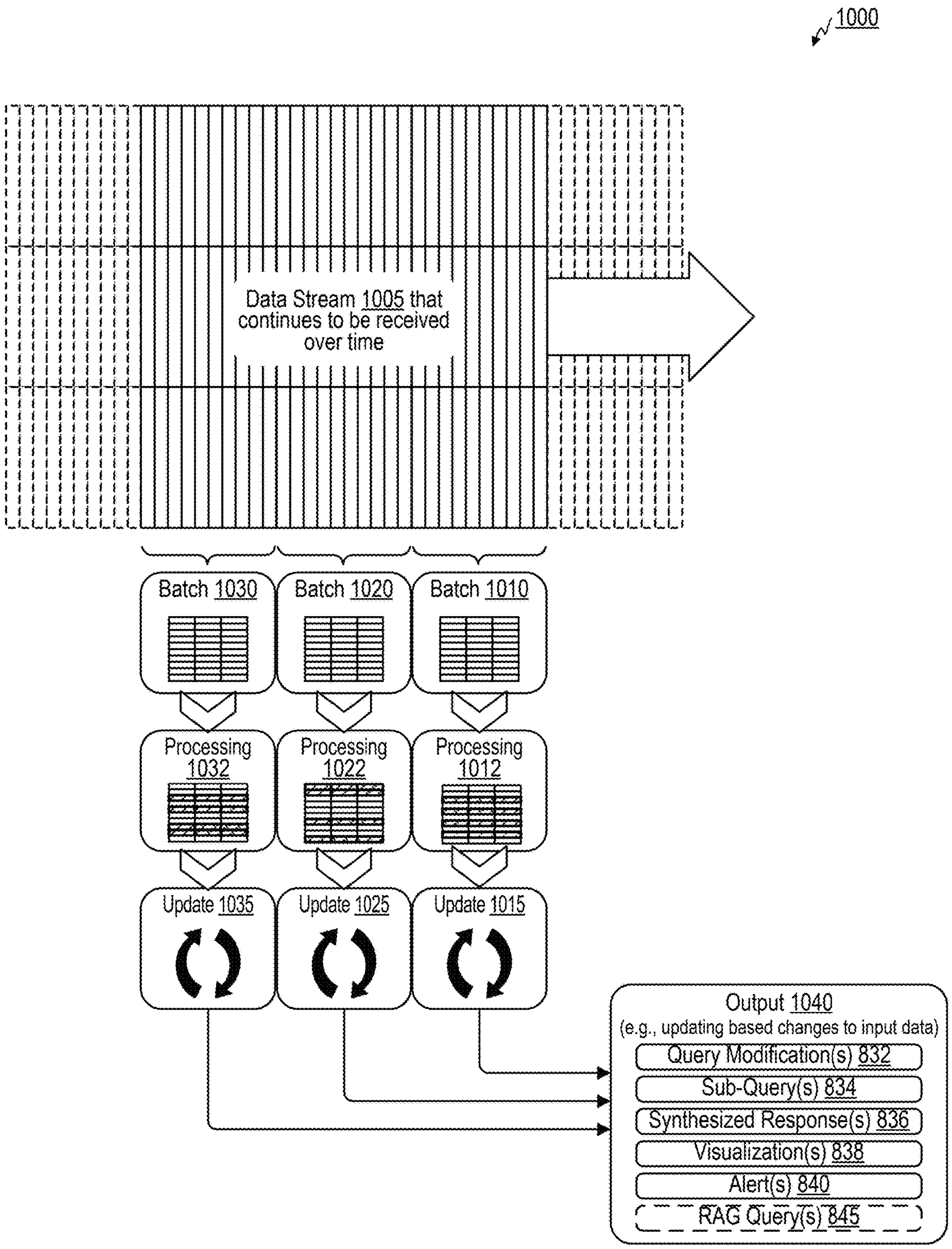
FIG. 10 is a conceptual diagram illustrating a process for dynamically updating an output (that is generated using ML model(s)) in a continuous fashion as further data continues to be received over time, in accordance with some examples.

FIG. 10 is a conceptual diagram illustrating a process 1000 for dynamically updating an output 1040 (that is generated using ML model(s)) in a continuous fashion as further data continues to be received over time, in accordance with some examples.

A data stream 1005 is illustrated, and can represent, for instance, a stream of data to be input into the ML model(s) 825 to generate an output 1040 (e.g., of one or more of the types of the output(s) 830, such as the modification(s) 832, the sub-query(s) 834, the response(s) 836, the visualization(s) 838, the alert(s) 840, and/or the RAG query(s) 845). In some examples, the data stream 1005 is an example of at least a portion of the information 810. In some examples, the data stream 1005 can include any of the types of data discussed with respect to the information 810, such as user information, product qualification criteria, rules, or a combination thereof. The data stream 1005 includes large quantities of data that continue to be received over a long period of time. For instance, the data stream 1005 can include records of transactions that continue to occur over time. The output 1040 can be an example of one or more of the output(s) 830, or vice versa.

In some examples, a system (e.g., the machine learning system 800, other systems discussed herein, or a combination thereof) can extract batches of data (e.g., batch 1010, batch 1020, batch 1030) from the data stream 1005 dynamically and in real-time (or near-real-time) as the data from the data stream 1005 continues to be received by the system. In some examples, the system can process the batches of data (e.g., using the ML model(s) 825) dynamically and in real-time (or near-real-time) as the data from the data stream 1005 continues to be received by the system to generate update(s) to an output 1040 of the output(s) 830. For instance, the batch 1010 undergoes processing 1012 to generate the update 1015. The batch 1020 undergoes processing 1022 to generate the update 1025. The batch 1030 undergoes processing 1032 to generate the update 1035. The system updates the output 1040 (e.g., using the ML model(s)

825 of the machine learning system 800) based on the update 1015, the update 1025, and/or the update 1035, sequentially, in parallel, and/or in further batches of updates. For instance, the batch 1010, the batch 1020, the batch 1030, the update 1015, the update 1025, and/or the update 1035 can be added into the information 810, the previous output(s) 815, and/or can otherwise be added into the input(s) 805. In this way, the system continues to update the output 1040 as the data from the data stream 1005 continues to be received by the system, so that the output 1040 is up-to-date with the changes to the data stream 1005.

In some examples, the data stream 1005 may include, for instance, at least a portion of the information 810. In some examples, the processing 1012, the processing 1022, and/or the processing 1032, can include processing operations applied by the ML model(s) 825 to the input(s) 805 to generate the output(s) 830. In some examples, the processing 1012, the processing 1022, and/or the processing 1032, can include processing operations such as normalization, reformatting, conversion between data types, rearrangement of data, removal of outliers, correction of errors, or a combination thereof. In some examples, the processing 1012, the processing 1022, and/or the processing 1032, can include processing operations using trained machine learning model(s) (e.g., the ML model(s) 825) to generate updates to the output 1040. In some examples, the updates to the output 1040 (e.g., update 1015, update 1025, update 1035) can represent additional information (e.g., updates to the information 810) to be input into the ML model(s) 825 for analysis and updating of the output(s) 830 (e.g., the output 1040). In some examples, the updates to the output 1040 are each new and updated instances of the output 1040. In some examples, the updates to the output 1040 include differences compared to a previous instance of the output 1040, so that the updates to the output 1040 can be combined with the previous instance of the output 1040 to generate an updated output 1040.

In some examples, the updates (e.g., update 1015, update 1025, update 1035) can include feedback 855, training data, fine-tuning data, context data, model parameters (e.g., temperature, top P, frequency penalty, presence penalty and/or other parameters or settings) for training, re-training, fine-tuning, and/or updating the ML model(s) 825 (e.g., as in the update 860) in addition to, or instead of, updating the output 1040.

Figure 11:
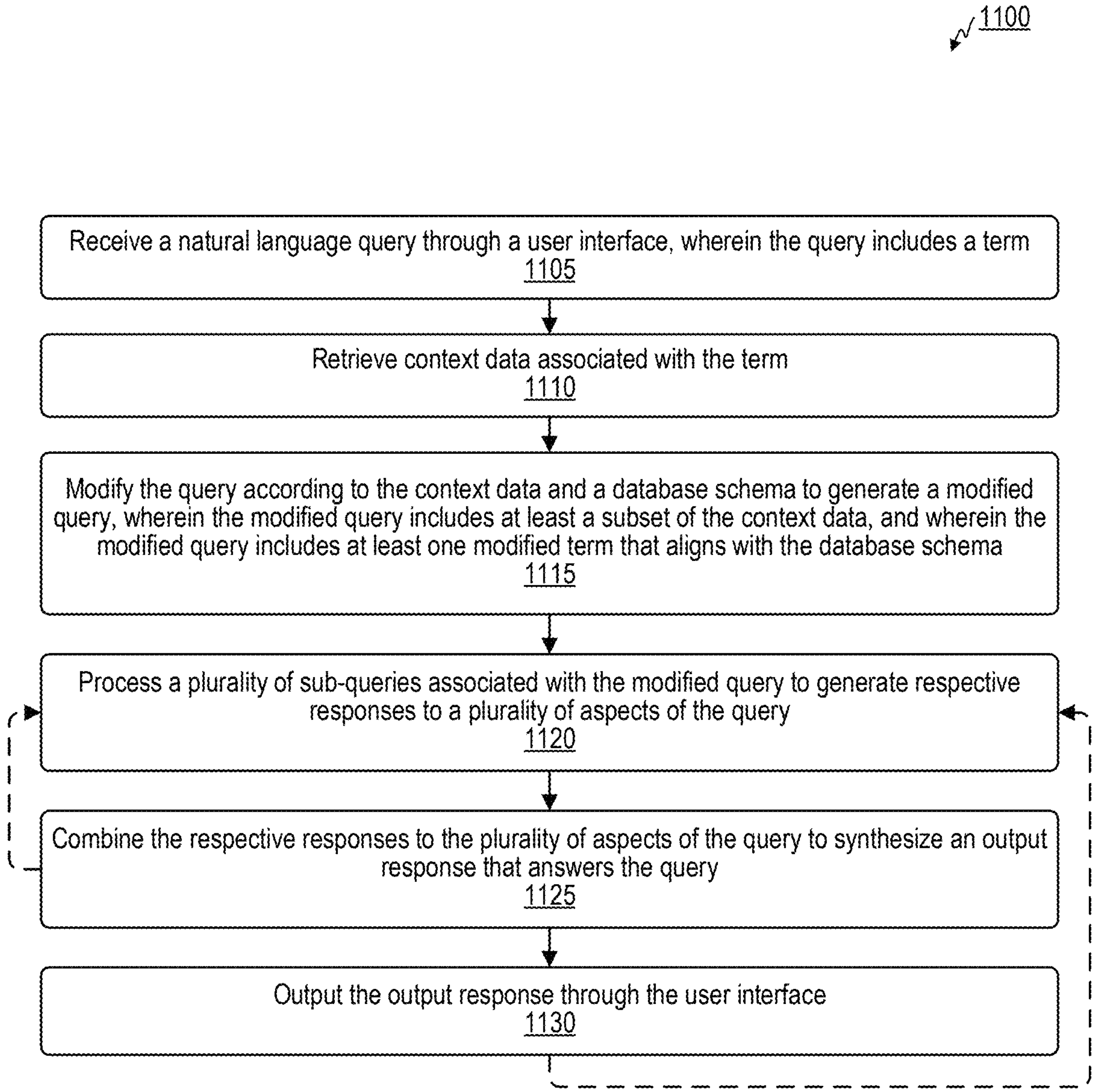
FIG. 11 is a flow diagram illustrating a process for responsive interfacing, in accordance with some examples.

FIG. 11 is a flow diagram illustrating a process 1100 for responsive interfacing. The process 1100 can be performed by a responsive interfacing system, such as the responsive interfacing system 100, a system with the user interface 210, a system with the user interface 310, a system with the user interface 410, a system with the user interface 510, a system with the user interface 610, the interfacing system that performs the process 700, the machine learning system 800, the RAG system 900, a system that performs the process 1000, the metric tracking system that performs the process 1200, a computer system 1300, a computing device, an apparatus, a processor executing instructions stored in a memory, a processor executing instructions stored in a non-transitory computer-readable storage medium, a component or sub-system of any of these systems, or a combination thereof.

At operation 1105, the responsive interfacing system (or a subset or component thereof) is configured to, and can, receive a query (e.g., a natural language query) through a user interface. The query includes a term. Examples of the user interface include the user interface 210, the user interface 310, the user interface 410, the user interface 510, the user interface 610, other user interfaces discussed herein, or a combination thereof. Examples of the query include the natural language query 105, the user's query in the user interface 210, the user's request to create an alert in the user interface 310, the user's query in the user interface 410, the user's query for a bar chart in the user interface 510, a query related to any of the metrics that are tracked in the user interface 610, the query for a new cohort of operation 725, the query for monitoring of operation 735, the query for selection of query(s) 845, a natural language query in the input(s) 805 (e.g., in the information 810), the query 930, the prompt 935, a query in the data stream 1005, the query of operation 1205, or a combination thereof.

At operation 1110, the responsive interfacing system (or a subset or component thereof) is configured to, and can, retrieve context data associated with the term.

In some examples, retrieving the context data (as in batch 1010) includes retrieving the context data from a data source based on querying the data source using a retrieval augmented generation (RAG) query (e.g., query(s) 845, query 930) that is based on the term.

At operation 1115, the responsive interfacing system (or a subset or component thereof) is configured to, and can, modify the query according to the context data and a database schema to generate a modified query. The modified query includes at least a subset of the context data. The modified query includes at least one modified term (e.g., replacing the term referenced in the operation 1105 and/or the operation 1110, or a different term) that aligns with the database schema.

In some examples, modifying the query (as in operation 1115) includes processing the query using a trained machine learning model (e.g., AI engine 115, AI engine 135, AI engine 180, AI engine 190, ML model(s) 825, LLM(s) 925) that identifies a modification to the query (e.g., modification(s) 832, response(s) 955, output 1040). In some examples, the responsive interfacing system (or a subset or component thereof) is configured to, and can, update (e.g., as in the update 860) the trained machine learning model based on feedback (e.g., feedback 855) associated with the modified query and/or the output response.

At operation 1120, the responsive interfacing system (or a subset or component thereof) is configured to, and can, process a plurality of sub-queries (e.g., sub-queries 125A-125C) associated with the modified query to generate respective responses to a plurality of aspects of the query. In some examples, processing the sub-queries (as in operation 1120) can include performing actions identified by the responsive interfacing system, such as the actions 130A-130C.

In some examples, the plurality of sub-queries (of operation 1120) include database queries associated with one or more databases, and the respective responses (generated in operation 1120) are based on one or more results of querying the one or more databases using the plurality of sub-queries.

In some examples, the responsive interfacing system (or a subset or component thereof) is configured to, and can, parse the modified query using a natural language processing algorithm, and generate the plurality of sub-queries (of operation 1120) based on the parsing of the modified query. In some examples, the plurality of sub-queries includes a database query associated with a database, and the processing of the plurality of sub-queries includes querying the database using the database query.

In some examples, processing a plurality of sub-queries (as in operation 1120) includes processing the plurality of sub-queries using a trained machine learning model (e.g., AI engine 115, AI engine 135, AI engine 180, AI engine 190, ML model(s) 825, LLM(s) 925) that generates the respective responses (e.g., responses to sub-query(s) 834, response(s) 836, visualization(s) 838). In some examples, the responsive interfacing system (or a subset or component thereof) is configured to, and can, update (e.g., as in the update 860) the trained machine learning model based on feedback (e.g., feedback 855) associated with the sub-queries, the respective responses, and/or the output response.

At operation 1125, the responsive interfacing system (or a subset or component thereof) is configured to, and can, combine (e.g., using the synthesizer 175 and/or the visualizer 185) the respective responses to the plurality of aspects of the query to synthesize an output response that answers the query.

In some examples, combining the respective responses (as in operation 1125) includes processing the respective responses using a trained machine learning model (e.g., AI engine 115, AI engine 135, AI engine 180, AI engine 190, ML model(s) 825, LLM(s) 925) that generates the output response (e.g., response(s) 836, visualization(s) 838, alert(s) 840). In some examples, the responsive interfacing system (or a subset or component thereof) is configured to, and can, update (e.g., as in the update 860) the trained machine learning model based on feedback (e.g., feedback 855) associated with the output response.

At operation 1130, the responsive interfacing system (or a subset or component thereof) is configured to, and can, output the output response through the user interface.

In some examples, the responsive interfacing system (or a subset or component thereof) is configured to, and can, select a visualization type from a plurality of visualization types based on the query and the database schema, and generate a visualization of the visualization type based on the respective responses. The output response (of operation 1125 and/or operation 1130) includes the visualization. In some examples, the responsive interfacing system (or a subset or component thereof) is configured to, and can, receive an interaction with an interactive interface element (e.g., interactive interface 660) corresponding to the visualization, and dynamically update the visualization based on the selection of the option. In some examples, the interaction is indicative of a selection of an option of a plurality of options, such as one of the options in the interactive interface 660 of the user interface 610 (e.g., specifying date range, date dimension, and/or whether to include the current period of time).

In some examples, the responsive interfacing system (or a subset or component thereof) is configured to, and can, analyze a plurality of datasets based on a metric to identify a plurality of types of data accessible in the plurality of datasets (e.g., associated with the database schema of operation 1115). The query includes a request to track the metric. Examples of the metric include the number of casino guests that haven't booked a cruise in FIGS. 2-3, the top 10 spenders in FIGS. 4-5, the various metrics in the user interface 610 (e.g., total call volume, average handle time, cost of service data quality, data quality savings, number of customers, lifetime value, loyalty tier, number of loyalty identifiers), various other metrics (e.g., year to date (YTD) revenue, YTD orders, YTD profit, YTD food waste, revenue, cost of goods sold (COGS), margin), the metrics in the process 700, the metric tracked in the process 1200, other metrics discussed herein, or a combination thereof. The responsive interfacing system can identify a calculation to calculate the metric using the plurality of types of data. The respective responses (of operation 1120) include historical data of the plurality of types of data from the plurality of datasets. The historical data is associated with a time period. Different subsets of the historical data are associated with different points in time within the time period. The output response (of operation 1125 and operation 1130) tracks the metric across the time period based on the historical data and the calculation.

In some examples where the responsive interfacing system tracks a metric, synthesizing the respective responses into an output response includes generating a visualization (e.g., using the visualizer 185) that tracks the metric across the time period based on the historical data and the calculation. Outputting the output response through the user interface includes outputting the visualization through the user interface. Examples of the visualization include visualizations generated by the visualizer 185, the bar chart of the user interface 210 and the user interface 310, the table 520, the bar chart 530, the boxes at the top of the user interface 610, the graph 620, the legend 625, the graph 630, the chart 640, the graph 650, the interactive interface 660, the data visualization of operation 730, the visualization(s) 838, the visualization of operation 1235, or a combination thereof.

In some examples where the responsive interfacing system tracks a metric, the responsive interfacing system (or a subset or component thereof) is configured to, and can, monitor the metric, identify that the metric has crossed a predetermined threshold, and send an alert (e.g., alert(s) 840) to a recipient device (e.g., interface device(s) 910, computer system 1300) automatically in response to the metric crossing the predetermined threshold.

In some examples, the responsive interfacing system (or a subset or component thereof) is configured to, and can, receive additional data, process the plurality of sub-queries (again, similarly to operation 1120) based on the additional data to update the respective responses, combine the respective responses as updated (similarly to operation 1125) to synthesize an updated output response that answers the query, and output the updated output response through the user interface (similarly to operation 1130).

Figure 12:
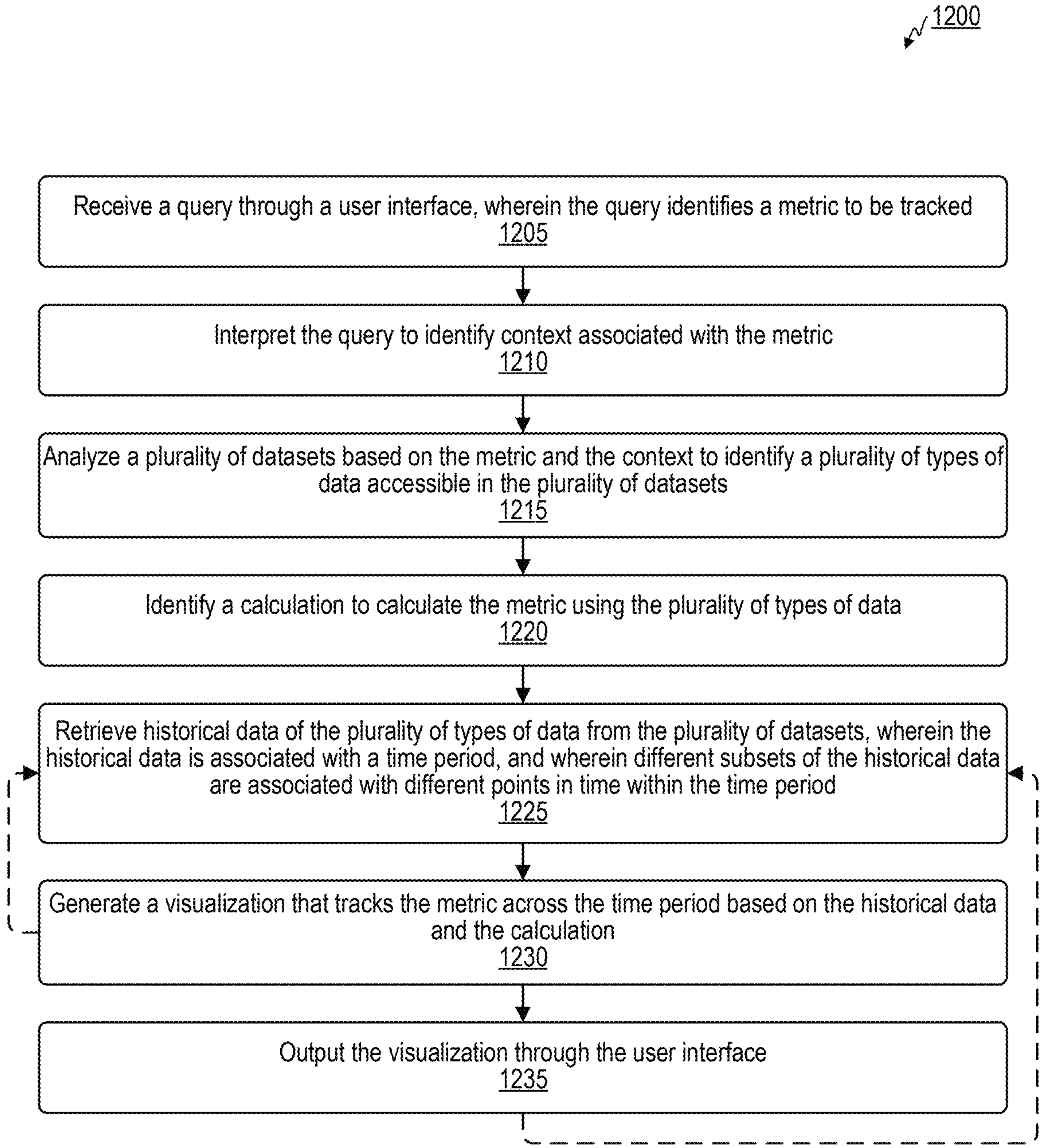
FIG. 12 is a flow diagram illustrating a process for metric tracking, in accordance with some examples.

FIG. 12 is a flow diagram illustrating a process 1200 for metric tracking. The process 1200 can be performed by a metric tracking system, such as the responsive interfacing system 100, a system with the user interface 210, a system with the user interface 310, a system with the user interface 410, a system with the user interface 510, a system with the user interface 610, the interfacing system that performs the process 700, the machine learning system 800, the RAG system 900, a system that performs the process 1000, the responsive interfacing system that performs the process 1100, a computer system 1300, a computing device, an apparatus, a processor executing instructions stored in a memory, a processor executing instructions stored in a non-transitory computer-readable storage medium, a component or sub-system of any of these systems, or a combination thereof.

At operation 1205, the metric tracking system (or a subset or component thereof) is configured to, and can, receive a query through a user interface. The query identifies a metric to be tracked.

Examples of the user interface include the user interface 210, the user interface 310, the user interface 410, the user interface 510, the user interface 610, other user interfaces discussed herein, or a combination thereof. Examples of the query include the natural language query 105, the user's query in the user interface 210, the user's request to create an alert in the user interface 310, the user's query in the user interface 410, the user's query for a bar chart in the user interface 510, a query related to any of the metric that are tracked in the user interface 610, the query for a new cohort of operation 725, the query for monitoring of operation 735, the query for selection of query(s) 845, a natural language query in the input(s) 805 (e.g., in the information 810), the query 930, the prompt 935, a query in the data stream 1005, the query of operation 1205, or a combination thereof. Examples of the metric include the number of casino guests that haven't booked a cruise in FIGS. 2-3, the top 10 spenders in FIGS. 4-5, the various metrics in the user interface 610 (e.g., YTD revenue, YTD orders, YTD profit, YTD food waste, revenue, COGS, food waste, margin), the metrics in the process 700, other metrics discussed herein, or a combination thereof.

In some examples, the metric tracking system (or a subset or component thereof) is configured to, and can, modify the query according to a database schema (e.g., as in operation 1115). The query, as modified, includes at least one modified term that aligns with the database schema (e.g., as in operation 1115).

At operation 1210, the metric tracking system (or a subset or component thereof) is configured to, and can, interpret the query to identify context associated with the metric.

In some examples, the metric tracking system (or a subset or component thereof) is configured to, and can, retrieve the context associated with the metric from a data source based on querying the data source using a retrieval augmented generation (RAG) query (e.g., RAG query(s) 845, query 930) that is based on the metric.

In some examples, interpreting the query to identify the context (as in operation 1210) includes processing the query using a trained machine learning model that identifies the context. In some examples, the metric tracking system (or a subset or component thereof) is configured to, and can, update (e.g., as in the update 860) the trained machine learning model based on feedback (e.g., feedback 855) associated with the context and/or the visualization.

At operation 1215, the metric tracking system (or a subset or component thereof) is configured to, and can, analyze a plurality of datasets based on the metric and the context to identify a plurality of types of data accessible in the plurality of datasets. In some examples, the datasets can include databases and/or other data structures. In some examples, the context can identify the datasets, or a database schema associated with the datasets.

In some examples, analyzing the plurality of datasets (as in operation 1215) includes analyzing the plurality of datasets using a trained machine learning model that identifies the plurality of types of data accessible in the plurality of datasets. In some examples, the metric tracking system (or a subset or component thereof) is configured to, and can, update (e.g., as in the update 860) the trained machine learning model based on feedback (e.g., feedback 855) associated with the visualization.

At operation 1220, the metric tracking system (or a subset or component thereof) is configured to, and can, identify a calculation (e.g., equation) to calculate the metric using the plurality of types of data.

In some examples, identifying the calculation (as in operation 1220) includes identifying the calculation using a trained machine learning model. In some examples, the metric tracking system (or a subset or component thereof) is configured to, and can, update (e.g., as in the update 860) the trained machine learning model based on feedback (e.g., feedback 855) associated with the calculation and/or the visualization.

At operation 1225, the metric tracking system (or a subset or component thereof) is configured to, and can, retrieve historical data of the plurality of types of data from the plurality of datasets. The historical data is associated with a time period. Different subsets of the historical data are associated with different points in time within the time period.

In some examples, the metric tracking system (or a subset or component thereof) is configured to, and can, divide the query into a plurality of sub-queries (e.g., the sub-queries 125A-125C, the sub-queries of operation 1120). Retrieving the historical data (as in operation 1225) is based on processing the plurality of sub-queries.

At operation 1230, the metric tracking system (or a subset or component thereof) is configured to, and can, generate a visualization that tracks the metric across the time period based on the historical data and the calculation. At operation 1235, the metric tracking system (or a subset or component thereof) is configured to, and can, output the visualization through the user interface.

In some examples, the visualization is a graph. A first axis of the graph corresponds to the metric, and a second axis of the graph corresponds to time. Examples of such a graph include the graph 620 and the graph 630.

In some examples, the metric tracking system (or a subset or component thereof) is configured to, and can, identify that the metric has crossed a predetermined threshold, and send an alert (e.g., alert(s) 840) to a recipient device (e.g., device(s) 910, computer system 1300) automatically in response to the metric crossing the predetermined threshold.

In some examples, generating the visualization (as in operation 1230) includes processing the historical data using a trained machine learning model and the calculation to generate the visualization. In some examples, the metric tracking system (or a subset or component thereof) is configured to, and can, update (e.g., as in the update 860) the trained machine learning model based on feedback (e.g., feedback 855) associated with the visualization.

Figure 13:
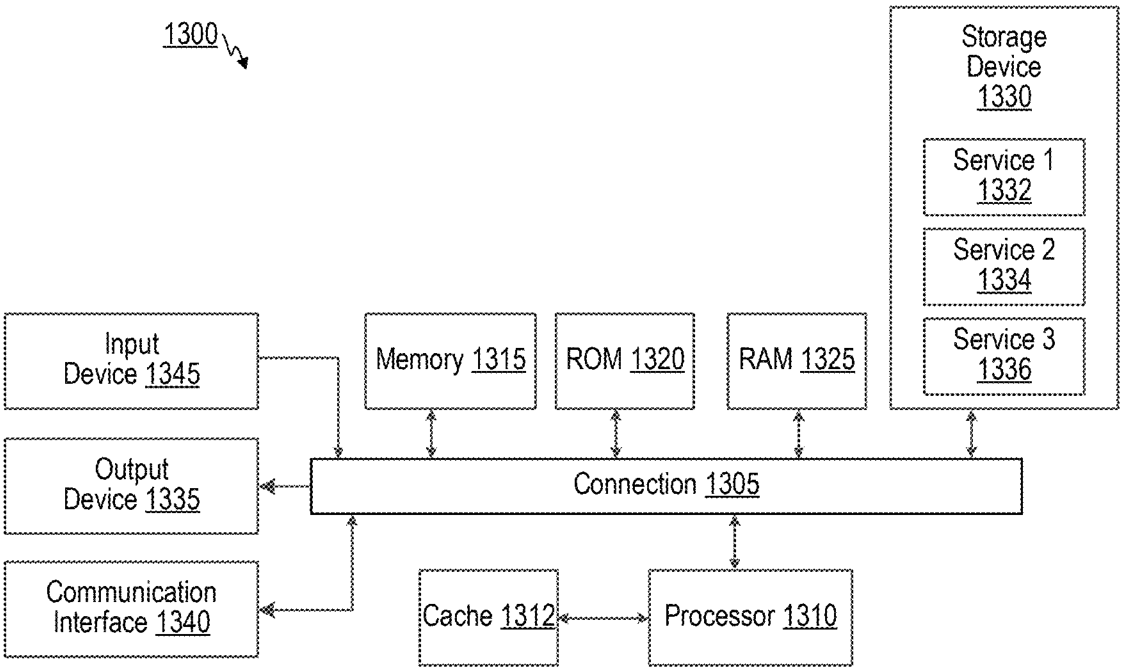
FIG. 13 is a block diagram of an exemplary computing device that may be used to implement some aspects of the technology.

FIG. 13 illustrates an exemplary computing system 1300 that may be used to implement some aspects of the technology. For example, any of the computing devices, computing systems, network devices, network systems, servers, and/or arrangements of circuitry described herein may include at least one computing system 1300, or may include at least one component of the computer system 1300 identified in FIG. 13. The computing system 1300 of FIG. 13 includes one or more processors 1310 and memory 1320. Each of the processor(s) 1310 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1310 may include one or more cores, either integrated onto a single chip or spread across multiple chips connected or coupled together. Memory 1320 stores, in part, instructions and data for execution by processor 1310. Memory 1320 can store the executable code when in operation. The computing system 1300 of FIG. 13 further includes a mass storage device 1330, portable storage device(s) 1340 (e.g., drive(s) and/or other storage media), output devices 1350, user input devices 1360, a display system 1370 (e.g., graphics display), and peripheral device(s) 1380.

The components shown in FIG. 13 are depicted as being connected via a single bus 1390. However, the components may be connected through one or more data transport means.

For example, processor 1310 and memory 1320 may be connected via a local microprocessor bus, and the mass storage device 1330, peripheral device(s) 1380, portable storage device 1340, and display system 1370 may be connected via one or more input/output (I/O) buses.

Mass storage device 1330, which may be implemented with a magnetic disk drive or an optical disk drive, is a non-volatile storage device for storing data and instructions for use by processor 1310. Mass storage device 1330 can store the system software for implementing some aspects of the subject technology for purposes of loading that software into memory 1320.

Portable storage device 1340 operates in conjunction with a portable non-volatile storage medium, such as a floppy disk, compact disk or Digital video disc, to input and output data and code to and from the computer system 1300 of FIG. 13. The system software for implementing aspects of the subject technology may be stored on such a portable medium and input to the computer system 1300 via the portable storage device 1340.

The memory 1320, mass storage device 1330, or portable storage device 1340 may in some cases store sensitive information, such as transaction information, health information, or cryptographic keys, and may in some cases encrypt or decrypt such information with the aid of the processor 1310. The memory 1320, mass storage device 1330, or portable storage device 1340 may in some cases store, at least in part, instructions, executable code, or other data for execution or processing by the processor 1310.

Output devices 1350 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1370. The printer may be inkjet, laserjet, thermal, or some combination thereof. In some cases, the output device 1350 (and/or associated circuitry) may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 502.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 1350 may include any ports, plugs, antennae, wired or wireless transmitters, wired or wireless transceivers, or any other components necessary for or usable to implement the communication types listed above, such as cellular Subscriber Identity Module (SIM) cards.

Input devices 1360 may include circuitry providing a portion of a user interface. Input devices 1360 may include an alpha-numeric keypad, such as a keyboard, for inputting alpha-numeric and other information, or a pointing device, such as a mouse, a trackball, stylus, or cursor direction keys. Input devices 1360 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 502.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 1360 may include any ports, plugs, antennae, wired or wireless receivers, wired or wireless transceivers, or any other components necessary for or usable to implement the communication types listed above, such as cellular SIM cards.

Input devices 1360 may include receivers or transceivers used for positioning of the computing system 1300 as well. These may include any of the wired or wireless signal receivers or transceivers. For example, a location of the computing system 1300 can be determined based on signal strength of signals as received at the computing system 1300 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1300 such as a router, modem, switch, hub, bridge, gateway, or repeater. These may also include Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1360 may include receivers or transceivers corresponding to one or more of these GNSS systems.

Display system 1370 may include a liquid crystal display (LCD), a plasma display, an organic light-emitting diode (OLED) display, a low-temperature poly-silicon (LTPO) display, an electronic ink or "e-paper" display, a projector-based display, a holographic display, or another suitable display device. Display system 1370 receives textual and graphical information, and processes the information for output to the display device. The display system 1370 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripheral device(s) 1380 may include any type of computer support device to add additional functionality to the computer system. For example, peripheral device(s) 1380 may include one or more additional output devices of any of the types discussed with respect to output device 1350, one or more additional input devices of any of the types discussed with respect to input device 1360, one or more additional display systems of any of the types discussed with respect to display system 1370, one or more memories or mass storage devices or portable storage devices of any of the types discussed with respect to memory 1320 or mass storage device 1330 or portable storage device 1340, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 1300 of FIG. 13 can include those typically found in computer systems that may be suitable for use with some aspects of the subject technology and represent a broad category of such computer components that are well known in the art. That said, the computer system 1300 of FIG. 13 can be customized and specialized for the purposes discussed herein and to carry out the various operations discussed herein, with specialized hardware components, specialized arrangements of hardware components, and/or specialized software. Thus, the computer system 1300 of FIG. 13 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1300 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1300 may also use a Basic Input/Output System (BIOS) or Unified Extensible Firmware Interface (UEFI) as a layer upon which the operating system(s) are run.

In some cases, the computer system 1300 may be part of a multi-computer system that uses multiple computer systems 1300, each for one or more specific tasks or purposes. For example, the multi-computer system may include multiple computer systems 1300 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1300 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1320, the mass storage device 1330, the portable storage device 1340, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L7), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1310 for execution. A bus 1390 carries the data to system RAM or another memory 1320, from which a processor 1310 retrieves and executes the instructions. The instructions received by system RAM or another memory 1320 can optionally be stored on a fixed disk (mass storage device 1330/portable storage device 1340) either before or after execution by processor 1310. Various forms of storage may likewise be implemented as well as the necessary network interfaces and network topologies to implement the same.

While various flow diagrams and block diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1300 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically in response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

Illustrative aspects of the disclosure include:

Aspect 1. A method of responsive interfacing, the method comprising: receiving a query through a user interface, wherein the query includes a term; retrieving context data associated with the term; modifying the query according to the context data and a database schema to generate a modified query, wherein the modified query includes at least a subset of the context data, and wherein the modified query includes at least one modified term that aligns with the database schema; processing a plurality of sub-queries associated with the modified query to generate respective responses to a plurality of aspects of the query; combining the respective responses to the plurality of aspects of the query to synthesize an output response that answers the query; and outputting the output response through the user interface.

Aspect 2. The method of aspect 1, wherein the plurality of sub-queries include database queries associated with one or more databases, and wherein the respective responses are based on one or more results of querying the one or more databases using the plurality of sub-queries.

Aspect 3. The method of aspect 1, wherein retrieving the context data includes retrieving the context data from a data source based on querying the data source using a retrieval augmented generation (RAG) query that is based on the term.

Aspect 4. The method of aspect 1, further comprising: selecting a visualization type from a plurality of visualization types based on the query and the database schema; and generating a visualization of the visualization type based on the respective responses, wherein the output response includes the visualization.

Aspect 5. The method of aspect 4, further comprising: receiving an interaction with an interactive interface element corresponding to the visualization, wherein the interaction is indicative of a selection of an option of a plurality of options; and dynamically updating the visualization based on the selection of the option.

Aspect 6. The method of aspect 1, further comprising: parsing the modified query using a natural language processing algorithm; and generating the plurality of sub-queries based on the parsing of the modified query.

Aspect 7. The method of aspect 1, further comprising: analyzing a plurality of datasets based on a metric to identify a plurality of types of data accessible in the plurality of datasets, wherein the query includes a request to track the metric; and identifying a calculation to calculate the metric using the plurality of types of data, wherein the respective responses include historical data of the plurality of types of data from the plurality of datasets, wherein the historical data is associated with a time period, and wherein different subsets of the historical data are associated with different points in time within the time period, and wherein the output response tracks the metric across the time period based on the historical data and the calculation.

Aspect 8. The method of aspect 7, wherein synthesizing the respective responses into an output response includes generating a visualization that tracks the metric across the time period based on the historical data and the calculation, and wherein outputting the output response through the user interface includes outputting the visualization through the user interface.

Aspect 9. The method of aspect 7, further comprising: monitoring the metric; identifying that the metric has crossed a predetermined threshold; and sending an alert to a recipient device automatically in response to the metric crossing the predetermined threshold.

Aspect 10. The method of aspect 1, further comprising: receiving additional data; processing the plurality of sub-queries based on the additional data to update the respective responses; combining the respective responses as updated to synthesize an updated output response that answers the query; and outputting the updated output response through the user interface.

Aspect 11. The method of aspect 1, wherein modifying the query includes processing the query using a trained machine learning model that identifies a modification to the query.

Aspect 12. The method of aspect 1, wherein processing a plurality of sub-queries includes processing the plurality of sub-queries using a trained machine learning model that generates the respective responses.

Aspect 13. The method of aspect 1, wherein combining the respective responses includes processing the respective responses using a trained machine learning model that generates the output response.

Aspect 14. A system for responsive interfacing, the system comprising: a memory storing instructions; and a processor that executes the instructions, wherein execution of the instructions by the processor causes the processor to: receive a query through a user interface, wherein the query includes a term; retrieve context data associated with the term; modify the query according to the context data and a database schema to generate a modified query, wherein the modified query includes at least a subset of the context data, and wherein the modified query includes at least one modified term that aligns with the database schema; process a plurality of sub-queries associated with the modified query to generate respective responses to a plurality of aspects of the query; combine the respective responses to the plurality of aspects of the query to synthesize an output response that answers the query; and output the output response through the user interface.

Aspect 15. The system of aspect 14, wherein the plurality of sub-queries include database queries associated with one or more databases, and wherein the respective responses are based on one or more results of querying the one or more databases using the plurality of sub-queries.

Aspect 16. The system of aspect 14, wherein retrieving the context data includes retrieving the context data from a data source based on querying the data source using a retrieval augmented generation (RAG) query that is based on the term.

Aspect 17. The system of aspect 14, wherein the execution of the instructions by the processor causes the processor to: select a visualization type from a plurality of visualization types based on the query and the database schema; and generate a visualization of the visualization type based on the respective responses, wherein the output response includes the visualization.

Aspect 18. The system of aspect 17, wherein the execution of the instructions by the processor causes the processor to: receive an interaction with an interactive interface element corresponding to the visualization, wherein the interaction is indicative of a selection of an option of a plurality of options; and dynamically update the visualization based on the selection of the option.

Aspect 19. The system of aspect 14, wherein the execution of the instructions by the processor causes the processor to: parse the modified query using a natural language processing algorithm; and generate the plurality of sub-queries based on the parsing of the modified query.

Aspect 20. The system of aspect 14, wherein the execution of the instructions by the processor causes the processor to: analyze a plurality of datasets based on a metric to identify a plurality of types of data accessible in the plurality of datasets, wherein the query includes a request to track the metric; and identify a calculation to calculate the metric using the plurality of types of data, wherein the respective responses include historical data of the plurality of types of data from the plurality of datasets, wherein the historical data is associated with a time period, and wherein different subsets of the historical data are associated with different points in time within the time period, and wherein the output response tracks the metric across the time period based on the historical data and the calculation.

Aspect 21. The system of aspect 20, wherein synthesizing the respective responses into an output response includes generating a visualization that tracks the metric across the time period based on the historical data and the calculation, and wherein outputting the output response through the user interface includes outputting the visualization through the user interface.

Aspect 22. The system of aspect 20, wherein the execution of the instructions by the processor causes the processor to: monitor the metric; identify that the metric has crossed a predetermined threshold; and send an alert to a recipient device automatically in response to the metric crossing the predetermined threshold.

Aspect 23. The system of aspect 14, wherein the execution of the instructions by the processor causes the processor to: receive additional data; process the plurality of sub-queries based on the additional data to update the respective responses; combine the respective responses as updated to synthesize an updated output response that answers the query; and output the updated output response through the user interface.

Aspect 24. The system of aspect 14, wherein modifying the query includes processing the query using a trained machine learning model that identifies a modification to the query.

Aspect 25. The system of aspect 14, wherein processing a plurality of sub-queries includes processing the plurality of sub-queries using a trained machine learning model that generates the respective responses.

Aspect 26. The system of aspect 14, wherein combining the respective responses includes processing the respective responses using a trained machine learning model that generates the output response.

Aspect 27. A method of metric tracking, the method comprising: receiving a query through a user interface, wherein the query identifies a metric to be tracked; interpreting the query to identify context associated with the metric; analyzing a plurality of datasets based on the metric and the context to identify a plurality of types of data accessible in the plurality of datasets; identifying a calculation to calculate the metric using the plurality of types of data; retrieving historical data of the plurality of types of data from the plurality of datasets, wherein the historical data is associated with a time period, and wherein different subsets of the historical data are associated with different points in time within the time period; generating a visualization that tracks the metric across the time period based on the historical data and the calculation; and outputting the visualization through the user interface.

Aspect 28. The method of aspect 27, wherein the visualization is a graph, wherein a first axis of the graph corresponds to the metric, and wherein a second axis of the graph corresponds to time.

Aspect 29. The method of aspect 27, further comprising: identifying that the metric has crossed a predetermined threshold; and sending an alert to a recipient device automatically in response to the metric crossing the predetermined threshold.

Aspect 30. The method of aspect 27, further comprising: retrieving the context associated with the metric from a data source based on querying the data source using a retrieval augmented generation (RAG) query that is based on the metric.

Aspect 31. The method of aspect 27, further comprising: dividing the query into a plurality of sub-queries, wherein retrieving the historical data is based on processing the plurality of sub-queries.

Aspect 32. The method of aspect 27, further comprising: modifying the query according to a database schema, wherein the query as modified includes at least one modified term that aligns with the database schema.

Aspect 33. The method of aspect 27, wherein interpreting the query to identify the context includes processing the query using a trained machine learning model that identifies the context.

Aspect 34. The method of aspect 27, wherein analyzing the plurality of datasets includes analyzing the plurality of datasets using a trained machine learning model that identifies the plurality of types of data accessible in the plurality of datasets.

Aspect 35. The method of aspect 27, wherein identifying the calculation includes identifying the calculation using a trained machine learning model.

Aspect 36. The method of aspect 27, wherein generating the visualization includes processing the historical data using a trained machine learning model and the calculation to generate the visualization.

Aspect 37. A system for metric tracking, the system comprising: a memory storing instructions; and a processor that executes the instructions, wherein execution of the instructions by the processor causes the processor to: receive a query through a user interface, wherein the query identifies a metric to be tracked; interpret the query to identify context associated with the metric; analyze a plurality of datasets based on the metric and the context to identify a plurality of types of data accessible in the plurality of datasets; identify a calculation to calculate the metric using the plurality of types of data; retrieve historical data of the plurality of types of data from the plurality of datasets, wherein the historical data is associated with a time period, and wherein different subsets of the historical data are associated with different points in time within the time period; generate a visualization that tracks the metric across the time period based on the historical data and the calculation; and output the visualization through the user interface.

Aspect 38. The system of aspect 37, wherein the visualization is a graph, wherein a first axis of the graph corresponds to the metric, and wherein a second axis of the graph corresponds to time.

Aspect 39. The system of aspect 37, wherein the execution of the instructions by the processor causes the processor to: identify that the metric has crossed a predetermined threshold; and send an alert to a recipient device automatically in response to the metric crossing the predetermined threshold.

Aspect 40. The system of aspect 37, wherein the execution of the instructions by the processor causes the processor to: retrieve the context associated with the metric from a data source based on querying the data source using a retrieval augmented generation (RAG) query that is based on the metric.

Aspect 41. The system of aspect 37, wherein the execution of the instructions by the processor causes the processor to: divide the query into a plurality of sub-queries, wherein retrieving the historical data is based on processing the plurality of sub-queries.

Aspect 42. The system of aspect 37, wherein the execution of the instructions by the processor causes the processor to: modify the query according to a database schema, wherein the query as modified includes at least one modified term that aligns with the database schema.

Aspect 43. The system of aspect 37, wherein interpreting the query to identify the context includes processing the query using a trained machine learning model that identifies the context.

Aspect 44. The system of aspect 37, wherein analyzing the plurality of datasets includes analyzing the plurality of datasets using a trained machine learning model that identifies the plurality of types of data accessible in the plurality of datasets.

Aspect 45. The system of aspect 37, wherein identifying the calculation includes identifying the calculation using a trained machine learning model.

Aspect 46. The system of aspect 37, wherein generating the visualization includes processing the historical data using a trained machine learning model and the calculation to generate the visualization.

Aspect 47. A non-transitory computer-readable medium having stored thereon instructions that, when executed by at least one processor, cause the at least one processor to perform operations according to any of Aspects 1 to 46.

Aspect 48. An apparatus for wireless communications, comprising one or more means for performing operations according to any of Aspects 1 to 46.

What is claimed is:

1. A method of responsive interfacing, the method comprising:

receiving a query at a server and from a user device through a network, wherein the query includes a term associated with an object;

retrieving, by the server and from a database, context data that is associated with the term and that identifies a plurality of relationships between a plurality of objects that includes the object;

modifying, by the server, the query according to the context data and a database schema corresponding to the database to generate a modified query, wherein the modifying the query includes replacing the term in the query with a modified term that aligns with the database schema in the modified query, wherein the modifying the query further includes adding a subset of the context data to the query to be included in the modified query, and wherein the subset of the context data is associated with the modified term and includes at least one relationship of the plurality of relationships;

generating, by the server and based on the modified query, a first sub-query assigned to a first algorithm and a second sub-query assigned to a second algorithm, wherein the second algorithm is different from the first algorithm;

automatically processing, by the server, the first sub-query using the first algorithm and the second sub-query using the second algorithm in parallel to generate a first response to the first sub-query and a second response to the second sub-query;

combining, by the server, the first response and the second response to synthesize an output response that answers the query and is formatted based on the query and the database schema;

outputting, from the server and to the user device through the network, the output response;

receiving an interaction with an interactive interface element corresponding to a visualization generated based on the output response and a visualization type selected from a plurality of visualization types, wherein the interaction is indicative of a selection of an option of a plurality of options; and dynamically updating the visualization based on the selection of the option.

2. The method of claim 1, wherein the first sub-query and the second sub-query include database queries associated with one or more databases, and wherein the first response and the second response are based on one or more results of querying the one or more databases using the first sub-query and the second sub-query.

3. The method of claim 1, wherein retrieving the context data includes retrieving the context data from a data source based on querying the data source using a retrieval augmented generation (RAG) query that is based on the term.

4. The method of claim 1, further comprising:

selecting the visualization type from the plurality of visualization types based on the query and the database schema; and generating the visualization of the visualization type based on the output response.

5. The method of claim 1, further comprising:
parsing the modified query using a natural language processing algorithm; and
based on parsing the modified query, generating the first sub-query and the second sub-query.

6. The method of claim 1, further comprising:
analyzing a plurality of datasets based on a metric to identify a plurality of types of data accessible in the plurality of datasets, wherein the query includes a request to track the metric; and
identifying a calculation to calculate the metric using the plurality of types of data, wherein the first response and the second response include historical data of the plurality of types of data from the plurality of datasets, wherein the historical data is associated with a time period, and wherein different subsets of the historical data are associated with different points in time within the time period, and wherein the output response tracks the metric across the time period based on the historical data and the calculation.

7. The method of claim 6, wherein synthesizing the first response and the second response into the output response includes tracking, through the visualization, the metric across the time period based on the historical data and the calculation, and wherein outputting the output response through an interactive user interface includes outputting the visualization through the interactive user interface.

8. The method of claim 6, further comprising:
monitoring the metric;
identifying that the metric has crossed a predetermined threshold; and
sending a message indicating that the metric has crossed the predetermined threshold to a recipient device automatically in response to the metric crossing the predetermined threshold.

9. The method of claim 1, further comprising:
receiving additional data;
automatically processing the first sub-query and the second sub-query based on the additional data to update the first response and the second response;
combining the first response and the second response as updated to synthesize an updated output response that answers the query; and
outputting the updated output response through an interactive user interface.

10. The method of claim 1, wherein modifying the query includes processing the query using a trained machine learning model that identifies a modification to the query.

11. The method of claim 1, wherein automatically processing the first sub-query and the second sub-query includes using a trained machine learning model that generates the first response and the second response.

12. The method of claim 1, wherein combining the first response and the second response includes processing the first response and the second response using a trained machine learning model that generates the output response.

13. A system for responsive interfacing, the system comprising:
a memory storing instructions; and
a processor that executes the instructions, wherein execution of the instructions by the processor causes the processor to:
receive a query at a server and from a user device through a network, wherein the query includes a term associated with an object;
retrieve, by the server and from a database, context data that is associated with the term and that identifies a plurality of relationships between a plurality of objects that includes the object;
modify, by the server, the query according to the context data and a database schema corresponding to the database to generate a modified query, wherein the modifying the query includes replacing the term in the query with a modified term that aligns with the database schema in the modified query, wherein the modifying the query further includes adding a subset of the context data to the query to be included in the modified query, and wherein the subset of the context data is associated with the modified term and includes at least one relationship of the plurality of relationships;
generate, by the server and based on the modified query, a first sub-query assigned to a first algorithm and a second sub-query assigned to a second algorithm, wherein the second algorithm is different from the first algorithm;
automatically process, by the server, the first sub-query using the first algorithm and the second sub-query using the second algorithm in parallel to generate a first response to the first sub-query and a second response to the second sub-query;
combine, by the server, the first response and the second response to synthesize an output response that answers the query and is formatted based on the query and the database schema;
output, from the server and to the user device through the network, the output response;
receiving an interaction with an interactive interface element corresponding to a visualization generated based on the output response and a visualization type selected from a plurality of visualization types, wherein the interaction is indicative of a selection of an option of a plurality of options; and
dynamically updating the visualization based on the selection of the option.

14. The system of claim 13, wherein the first sub-query and the second sub-query include database queries associated with one or more databases, and wherein the first response and the second response are based on one or more results of querying the one or more databases using the first sub-query and the second sub-query.

15. The system of claim 13, wherein retrieving the context data includes retrieving the context data from a data source based on querying the data source using a retrieval augmented generation (RAG) query that is based on the term.

16. The system of claim 13, wherein the execution of the instructions by the processor causes the processor to:
select the visualization type from the plurality of visualization types based on the query and the database schema; and
generate the visualization of the visualization type based on the output response.

17. The system of claim 13, wherein the execution of the instructions by the processor causes the processor to:
analyze a plurality of datasets based on a metric to identify a plurality of types of data accessible in the plurality of datasets, wherein the query includes a request to track the metric; and
identify a calculation to calculate the metric using the plurality of types of data, wherein the first response and the second response include historical data of the plurality of types of data from the plurality of datasets, wherein the historical data is associated with a time period, and wherein different subsets of the historical data are associated with different points in time within the time period, and wherein the output response tracks the metric across the time period based on the historical data and the calculation.

18. The system of claim 17, wherein the execution of the instructions by the processor causes the processor to:

monitor the metric;

identify that the metric has crossed a predetermined threshold; and send a message indicating that the metric has crossed the predetermined threshold to a recipient device automatically in response to the metric crossing the predetermined threshold.

19. The system of claim 13, wherein the execution of the instructions by the processor causes the processor to:

receive additional data;

automatically process the first sub-query and the second sub-query based on the additional data to update the first response and the second response;

combine the first response and the second response as updated to synthesize an updated output response that answers the query; and output the updated output response through an interactive user interface.

20. The system of claim 13, wherein modifying the query includes processing the query using a trained machine learning model that identifies a modification to the query.

* * * * *